(12) United States Patent
Han et al.

(10) Patent No.: US 11,445,396 B2
(45) Date of Patent: Sep. 13, 2022

(54) CHANNEL MEASUREMENT METHOD AND APPARATUS

(71) Applicant: HUAWEI TECHNOLOGIES CO., LTD., Shenzhen (CN)

(72) Inventors: Wei Han, Shanghai (CN); Huangping Jin, Shanghai (CN); Ye Wu, Shanghai (CN); Xiaoyan Bi, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 142 days.

(21) Appl. No.: 16/674,858

(22) Filed: Nov. 5, 2019

(65) Prior Publication Data
US 2020/0068426 A1 Feb. 27, 2020

Related U.S. Application Data

(63) Continuation of application No. PCT/CN2018/106222, filed on Sep. 18, 2018.

(30) Foreign Application Priority Data

Oct. 10, 2017 (CN) .......................... 201710935554.4

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0626* (2013.01); *H04L 5/0048* (2013.01);
(Continued)

(58) Field of Classification Search
CPC ..................... H04W 24/10; H04W 72/0453; H04B 7/0626; H04L 5/0048; H04L 5/0057; H04L 25/0202
See application file for complete search history.

(56) References Cited

U.S. PATENT DOCUMENTS

2011/0034198 A1* 2/2011 Chen .................. H04L 25/0202
                                                              455/509
2012/0320778 A1 12/2012 Lv et al.
(Continued)

FOREIGN PATENT DOCUMENTS

CN         102291752 A    12/2011
EP         2753002 A2      7/2014
(Continued)

OTHER PUBLICATIONS

Samsung et al: "WF for Open Issues on CSI Reporting",3GPP Draft; R1-1716901,Sep. 25, 2017,XP051353976,total 20 pages.
(Continued)

*Primary Examiner* — Jackie Zuniga Abad
(74) *Attorney, Agent, or Firm* — Stein IP, LLC

(57) ABSTRACT

Embodiments of the present invention provide a channel measurement method and an apparatus. The method includes: for a to-be-measured frequency band that includes at least one reporting subband and 0 or more non-reporting subbands, obtaining channel state information of each reporting subband, where the channel state information of each reporting subband is obtained based on channel estimation, and the at least one reporting subband is included in reporting subbands that are contiguous in frequency domain, or the at least one reporting subband is included in reporting subbands that are not contiguous in frequency domain; and sending a measurement report of the to-be-measured frequency band to a transmit end device, where the measurement report includes the channel state information of one or more of the at least one reporting subband.

18 Claims, 16 Drawing Sheets

(51) Int. Cl.
*H04L 5/00* (2006.01)
*H04L 25/02* (2006.01)
*H04W 72/04* (2009.01)

(52) U.S. Cl.
CPC ........ *H04L 5/0057* (2013.01); *H04L 25/0202* (2013.01); *H04W 72/0453* (2013.01)

(56) References Cited

U.S. PATENT DOCUMENTS

2015/0172024 A1* 6/2015 Kim .................... H04B 7/0486
                                                                370/329
2016/0226649 A1   8/2016 Papasakellariou et al.
2016/0295573 A1* 10/2016 Lee ....................... H04L 5/001
2018/0254815 A1   9/2018 Liu
2019/0199420 A1* 6/2019 Faxer .................. H04B 7/0632

FOREIGN PATENT DOCUMENTS

WO   2014000227 A1   1/2014
WO   2017075821 A1   5/2017

OTHER PUBLICATIONS

Huawei et al,"Details of CSI reporting on PUCCH/PUSCH",3GPP TSG RAN WG1 Meeting #90bis,R1-1717300,Prague,Czech Republic, Oct. 9-13, 2017, total 3 pages.

* cited by examiner

CHANNEL MEASUREMENT METHOD AND APPARATUS

CROSS-REFERENCE TO RELATED APPLICATIONS

This application is a continuation of International Application No. PCT/CN2018/106222, filed on Sep. 18, 2018, which claims priority to Chinese Patent Application No. 201710935554.4, filed on Oct. 10, 2017. The disclosures of the aforementioned applications are hereby incorporated by reference in their entireties.

TECHNICAL FIELD

Embodiments of the present invention relate to channel measurement technologies, and in particular, to a channel measurement method, a transmit end device, and a receive end device.

BACKGROUND

Obtaining channel state information (Channel State Information, CSI) through channel measurement is vital for improvement of transmission quality of wireless communication. During channel measurement, a receive end device (for example, user equipment such as a smartphone) obtains channel state information based on a reference signal (Reference Signal, RS) transmitted by a transmit end device (for example, an access device such as a base station), and feeds back the obtained CSI to the transmit end device. The transmit end device processes a transmit signal based on the CSI and sends the processed transmit signal to the receive end device. It can be learned that CSI-based wireless transmission better suits a channel environment, and therefore, transmission quality is better.

The CSI may be usually sent from the receive end device to the transmit end device through a physical uplink shared channel (Physical Uplink Shared Channel, PUSCH). The CSI transmitted through the PUSCH may include wideband (Wideband) CSI, or may include a plurality pieces of subband (Subband) CSI, or may include both wideband CSI and a plurality pieces of subband CSI. The wideband CSI may be understood as CSI that is calculated based on a wideband, and the subband CSI may be understood as CSI that is calculated based on a subband. The wideband described herein may be, for example, but is not limited to, entire system bandwidth, or bandwidth corresponding to a radio frequency carrier, or may be an entire piece of bandwidth. The entire piece of bandwidth includes a plurality of subbands, and an example of the entire piece of bandwidth may be to-be-measured bandwidth to be described below. The wideband may be divided into a plurality of subbands, and a width of the subband may be set based on, for example, but not limited to a specific system design requirement. When a relatively large amount of subband CSI needs to be fed back, large overheads are caused.

Therefore, a technical solution which can reduce feedback overheads of the subband CSI is required.

SUMMARY

In view of this, it is necessary to provide a channel measurement solution, which can reduce feedback overheads of subband CSI.

According to a first aspect of embodiments of the present invention, a channel measurement method is provided. The method includes:

for a to-be-measured frequency band that includes at least one reporting subband and 0or more non-reporting subbands, obtaining channel state information of each reporting subband, where the channel state information of each reporting subband is obtained based on channel estimation, and the at least one reporting subband is included in reporting subbands that are contiguous in frequency domain, or the at least one reporting subband is included in reporting subbands that are not contiguous in frequency domain; and sending a measurement report of the to-be-measured frequency band to a transmit end device, where the measurement report includes the channel state information of one or more of the at least one reporting subband.

It should be noted that, in all embodiments of the present invention, the non-reporting subband may also be referred to as a missing subband, a default subband, or an omitted subband, and the non-reporting subband indicates a subband whose channel state information does not need to be reported.

In a first possible design, the method further includes:

receiving reporting subband configuration information from the transmit end device or searching for locally pre-stored reporting subband configuration information, where the reporting subband configuration information is used to indicate a reporting band and a subband that is a reporting subband in the reporting band; and determining at least one reporting subband in the reporting band based on the reporting subband configuration information.

In an implementation of the first possible design, the reporting subband configuration information is implemented by using a bitmap, and the reporting subband configuration information includes reporting subband indication information. Optionally, the reporting subband configuration information further includes reporting band indication information.

The reporting band indication information indicates a start position of a subband and a quantity of subbands, or indicates a start position and an end position of the subbands.

The reporting subband indication information includes a first information bitmap, and the first information bitmap is used to indicate the reporting subband and a non-reporting subband in the reporting band.

Optionally, all subbands in the reporting band may be reporting subbands, or some subbands are reporting subbands and some subbands are non-reporting subbands. The reporting subband may be indicated by an information bit 1, and the non-reporting subband is indicated by an information bit 0. Alternatively, the reporting subband is indicated by the information bit 0, and the non-reporting subband is indicated by the information bit 1.

Optionally, a quantity of bits of the first information bitmap is the same as a quantity of actual reporting subbands, and all bits in the first information bitmap are used to indicate the reporting subband and the non-reporting subband; or a quantity of the first information bits is the same as a maximum quantity of reporting subbands that is allowed by a system, and some or all bits in the first information bitmap are used to indicate the reporting subband and the non-reporting subband.

In a second possible design, the method further includes:

receiving dynamic signaling, where the dynamic signaling includes a third information bitmap, and the third information bitmap is used to indicate an index of the first information bitmap; and selecting based on an index indicator of the third information bitmap, the reporting subband and the non-reporting subband that are indicated by the first information bitmap.

In a third possible design, the method further includes:

receiving reporting subband group configuration information from the transmit end device or searching for locally prestored reporting subband group configuration information, where the reporting subband group configuration information is used to indicate a subband group that is a reporting subband group in the reporting band; and determining at least one reporting subband group in the reporting band based on the reporting subband group configuration information.

In an implementation of the fourth possible design, the reporting subband group configuration information is indicated in a bitmap manner, and the method includes:

receiving subband group indication information, where the subband group indication information includes a first parameter A, and the first parameter A indicates that one subband group includes A contiguous subbands; and dividing the reporting band into B subband groups based on the first parameter A.

The reporting subband group configuration information is represented by using a second information bitmap, and the second information bitmap is used to indicate a subband group that is a reporting subband group in the B subband groups; and contiguous reporting subbands include contiguous reporting subband groups in the B subband groups, or non-contiguous reporting subbands include non-contiguous reporting subband groups in the B subband groups.

A quantity of bits of the second information bitmap is the same as a quantity of actual reporting subband groups, and all bits in the second information bitmap are used to indicate the reporting subband group and a non-reporting subband group; or a quantity of the second information bitmaps is the same as a maximum quantity of reporting subband groups that is allowed by a system, and some or all bits in the second information bitmap are used to indicate the reporting subband group and a non-reporting subband group.

In a fifth possible design, the method further includes:

receiving dynamic signaling, where the dynamic signaling includes a third information bitmap, and the third information bitmap is used to indicate an index of the second information bitmap; and selecting, based on an index indicator of the third information bitmap, a reporting subband group or non-reporting subband group indicated by the second information bitmap.

In a sixth possible design, the reporting subband configuration information includes reporting subband start position indication information and reporting subband decimation indication information; the reporting subband start position indication information is used to indicate a start position of the reporting subband; and the reporting subband decimation indication information is used to instruct to decimate, from the start position of the reporting subband or from an offset of O subbands, the first N subbands or the last N subbands from every M contiguous subbands as reporting subbands.

In a seventh possible design, the N different reporting subbands that are decimated based on the reporting subband configuration information are further predefined as different subband subsets;

dynamic signaling is received, where the dynamic signaling is used to indicate an index of a subband subset; and a currently used subband subset is selected from the plurality of predefined subband subsets based on the index of the subband subset.

In an eighth possible design, the reporting subband configuration group information includes reporting subband group start position indication information and reporting subband group decimation indication information; the reporting subband group start position indication information is used to indicate a start position of the reporting subband group; and the reporting subband group decimation indication information is used to instruct to decimate, from the start position of the reporting subband group or from an offset of O subband groups, the first N subband groups or the last N subband groups from every M contiguous subband groups as reporting subband groups.

In a ninth possible design, the N different reporting subband groups that are decimated based on the different reporting subband group configuration information are predefined as different subband subsets;

dynamic signaling is received, where the dynamic signaling is used to indicate an index of a subband subset; and a currently used subband subset is selected from the plurality of predefined subband subsets based on the index of the subband subset.

In the foregoing nine possible designs, the channel state information is one of the following information:

a channel quality indicator, a precoding matrix indicator, a rank indication, or a channel state information reference signal resource indicator.

According to a second aspect of the embodiments of the present invention, a receive end device is provided. The device includes:

a processing module, configured to: for a to-be-measured frequency band that includes at least one reporting subband and 0 or more non-reporting subbands, obtain channel state information of each reporting subband, where the channel state information of each reporting subband is obtained based on channel estimation, and the at least one reporting subband is included in reporting subbands that are contiguous in frequency domain, or the at least one reporting subband is included in reporting subbands that are not contiguous in frequency domain; and a transceiver module, configured to send a measurement report of the to-be-measured frequency band to a transmit end device, where the measurement report includes the channel state information of one or more of the at least one reporting subband.

In a first possible design, the transceiver module receives reporting subband configuration information from the transmit end device or the processing module searches for locally prestored reporting subband configuration information, where the reporting subband configuration information is used to indicate a reporting band and a subband that is a reporting subband in the reporting band; and the processing module is further configured to determine at least one reporting subband in the reporting band based on the reporting subband configuration information.

In a possible design, the reporting subband configuration information received by the transceiver module or searched by the processing module includes reporting band indication information and reporting subband indication information;

the reporting band indication information indicates a start position of the reporting subband and a quantity of the reporting subbands, or includes a start position and an end position of the reporting subband; and the reporting subband indication information includes a first information bit, and the first information bitmap is used to indicate the reporting subband and a non-reporting subband in a range of the reporting band.

In a possible design, a quantity of bits of the first information bitmap is the same as a quantity of actual reporting subbands, and all bits in the first information bitmap are used to indicate the reporting subband and the non-reporting subband; or a quantity of bits of the first information bitmap is the same as a maximum quantity of reporting subbands that is allowed by a system, and some or all bits in the first information bitmap are used to indicate the reporting subband and the non-reporting subband.

In a possible design, the transceiver module is further configured to receive subband group indication information, where the subband group indication information includes a first parameter A, and the first parameter A indicates that one subband group includes A contiguous subbands; and the processing module is further configured to divide the reporting band into B subband groups based on the first parameter A.

In a possible design, the transceiver module receives reporting subband group configuration information from the transmit end device or the processing module searches for locally prestored reporting subband group configuration information, where the reporting subband group configuration information is used to indicate a subband group that is a reporting subband group in the reporting band; and the processing module is further configured to determine at least one reporting subband group in the reporting band based on the reporting subband group configuration information.

In a possible design, the reporting subband group configuration information received by the transceiver module or searched by the processing module is represented by using a second information bitmap, and the second information bitmap is used to indicate a subband group that is a reporting subband group in the B subband groups; and contiguous reporting subbands include contiguous reporting subband groups in the B subband groups, or non-contiguous reporting subbands include non-contiguous reporting subband groups in the B subband groups.

In a possible design, a quantity of bits of the second information bitmap is the same as a quantity of actual reporting subband groups, and all bits in the second information bitmap are used to indicate the reporting subband group and a non-reporting subband group; or a quantity of the second information bitmaps is the same as a maximum quantity of reporting subband groups that is avowed by a system, and some or all bits in the second information bitmap are used to indicate the reporting subband group and a non-reporting subband group.

In a possible design, the transceiver module is further configured to: receive dynamic signaling, where the dynamic signaling includes a third information bitmap, and the third information bitmap is used to indicate an index of the first information bitmap or an index of the second information bitmap; and select, based on an index indicator of the third information bitmap, the reporting subband and the non-reporting subband that are indicated by the first information bitmap or a reporting subband group or non-reporting subband group indicated by the second information bitmap.

In a possible design, the reporting subband configuration information received by the transceiver module or searched by the processing module includes reporting subband start position indication information and reporting subband decimation indication information; the reporting subband start position indication information is used to indicate a start position of the reporting subband; and the reporting subband decimation indication information is used to instruct to decimate, from the start position of the reporting subband or from an offset of O subbands, the first N subbands or the last N subbands from every M contiguous subbands as reporting subbands.

In a possible design, after the first N subbands or the last N subbands are decimated from every M contiguous subbands as the reporting subbands, reporting is performed after priority sorting is performed on the decimated reporting subbands.

In a possible design, the reporting subband group configuration information received by the transceiver module or searched by the processing module includes reporting subband group start position indication information and reporting subband group decimation indication information; the reporting subband group start position indication information is used to indicate a start position of the reporting subband group; and the reporting subband group decimation indication information is used to instruct to decimate, from the start position of the reporting subband group or from an offset of O subbands, the first N subband groups or the last N subband groups from every M contiguous subband groups as reporting subband groups.

In a possible design, after the first N subband groups or the last N subband groups are decimated from every M contiguous subband groups as the reporting subband groups, reporting is performed after priority sorting is performed on the decimated reporting subband groups.

In a possible design, the processing module is further configured to predefine the N different reporting subbands that are decimated based on the reporting subband configuration information as different subband subsets;

the transceiver module is further configured to receive dynamic signaling, where the dynamic signaling is used to indicate an index of a subband subset; and the processing module is further configured to select a currently used subband subset from the plurality of predefined subband subsets based on the index of the subband subsets.

In a possible design, the processing module is further configured to predefine the N different reporting subband groups that are decimated based on the different reporting subband group configuration information as different subband subsets;

the transceiver module is further configured to receive dynamic signaling, where the dynamic signaling is used to indicate an index of a subband subset; and the processing module is further configured to select a currently used subband subset from the plurality of predefined subband subsets based on the index of the subband subset.

In a possible design, the processing module is a processor, and the transceiver module is a transceiver.

According to a third aspect of the embodiments of the present invention, a channel measurement method is provided. The method includes:

receiving a measurement report of a to-be-measured frequency band from a receive end device, where the to-bemeasured frequency band includes at least one reporting subband and 0 or more non-reporting subbands, the measurement report includes channel state information of one or more of the at least one reporting subband, and the channel state information of the reporting subband is obtained by the receive end device based on channel estimation.

For the non-reporting subband, in a possible implementation, the transmit end device may perform scheduling and transmission based on reported subband information.

In another possible implementation, if an uplink channel resource is limited, the receive end device discards channel state information of some subbands (which are originally used as the reporting subbands), and the transmit end device obtains channel state information of the non-reporting subband based on the channel state information of the reporting subband. For example, interpolation (estimation) is performed on the channel state information of the reporting subband based on the reported channel state information of the one or more reporting subbands, to obtain the channel state information of the non-reporting subband.

In a possible design, the channel state information is one of the following information:

a channel quality indicator, a precoding matrix indicator, a rank indication, or a channel state information reference signal resource indicator.

According to a fourth aspect of the embodiments of the present invention, a transmit end device is provided. The device includes:

a transceiver module, configured to receive a measurement report of a to-be-measured frequency band from a receive end device, where the to-be-measured frequency band includes at least one reporting subband and 0 or more non-reporting subbands, the measurement report includes channel state information of one or more of the at least one reporting subband, and the channel state information of each reporting subband is obtained by the receive end device based on channel estimation; and a processing module, configured to: for a non-reporting subband, obtain channel state information of the non-reporting subband based on the channel state information of the reporting subband.

In a possible design, the channel state information is one of the following information:

a channel quality indicator, a precoding matrix indicator, a rank indication, or a channel state information reference signal resource indicator.

In a possible design, the processing module is a processor, and the transceiver module is a transceiver.

According to a fifth aspect of the embodiments of the present invention, a processor is provided. The processor is configured to perform any one of the foregoing methods, and steps related to transmission and reception should be understood to be performed by the processor by using a transceiver.

According to a sixth aspect of the embodiments of the present invention, a processing apparatus is provided. The apparatus includes:

a memory: and a processor, configured to read an instruction stored in the memory, to perform any one of the foregoing methods, and steps related to transmission and reception should be understood to be performed by the processor by using a transceiver.

The memory may be a non-transitory memory, for example, a read-only memory (Read-Only Memory, ROM). The memory may be integrated with the processor on a same chip, or may be separately disposed on different chips. A type of the memory and a manner of disposing the memory and the processor are not limited in this embodiment of the present invention.

According to a seventh aspect of the embodiments of the present invention, a computer-readable storage medium is provided. The computer-readable storage medium includes an instruction, and when the instruction is run on a computer, the computer is enabled to perform any one of the foregoing methods.

The computer-readable storage medium is non-transitory.

According to an eighth aspect of the embodiments of the present invention, a computer program product that includes an instruction is provided. When the computer program product is run on a computer, the computer is enabled to perform any one of the foregoing methods.

A beneficial effect of the embodiments of the present invention lies in that compared with a fed-back measurement report that includes channel state information of each subband, the measurement report fed back in the embodiments of the present invention includes only channel state information of some subbands, and the subbands may not only be contiguous subbands in frequency domain but also non-contiguous subbands in frequency domain. Therefore, feedback overheads caused by channel measurement are reduced.

DESCRIPTION OF EMBODIMENTS

A next-generation wireless communications system that is currently in a research and development stage may also be referred to as a new radio (New Radio, NR) system or a 5G system. A latest research progress of a next-generation wireless communication standard indicates that CSI may be sent from a receive end device to a transmit end device through a physical uplink shared channel (Physical Uplink Shared Channel, PUSCH). A person skilled in the art should understand that, compared with a physical uplink control channel (Physical Uplink Control Channel, PUCCH) that is mainly used to transmit control information, the PUSCH is mainly used to transmit data. Therefore, when transmitting the CSI, the PUSCH may further transmit data, or may not transmit data. For example, a PUSCH in an uplink subframe may transmit both CSI and data, or may transmit only CSI without transmitting data. The CSI is usually included in uplink control information (Uplink Control Information, UCI), and the UCI is transmitted through the PUSCH. The UCI may further include at least two parts. A quantity of information bits included in a first part is fixed, and the first part is used to indicate a quantity of information bits of a second part. In addition, a priority of the first part is higher than that of the second part. Further, the first part and the second part may be separately encoded. A person skilled in the art should understand that a finally determined next-generation wireless communication standard may also change and therefore is different from the latest research progress mentioned above.

Figure 1:
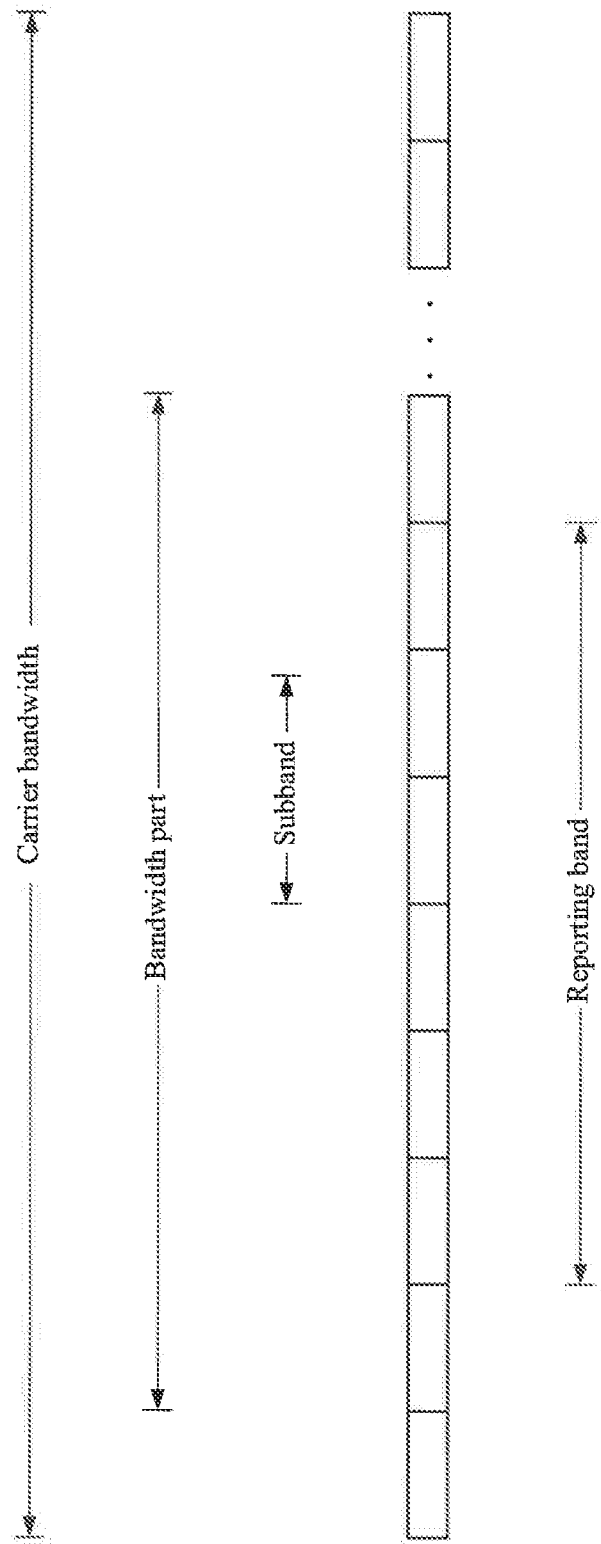
FIG. 1 is a schematic diagram of frequency band allocation according to an embodiment of the present invention.

FIG. 1 is a schematic diagram of frequency band allocation according to an embodiment of the present invention. As shown in FIG. 1, carrier bandwidth may be considered as a wideband, and further include at least one bandwidth part. Each bandwidth part includes at least one contiguous subband, and each subband further includes a plurality of contiguous subcarriers.

Each bandwidth part may correspond to a group of numerologies (numerology), including, but not limited to, a subcarrier spacing (Subcarrier spacing), a cyclic prefix (Cyclic Prefix, CP), and the like. Different bandwidth parts may correspond to different numerologies. Optionally, in a same transmission time interval (Transmission Time Interval, TTI), and in a plurality of bandwidth parts, only one bandwidth part is available, and other bandwidth parts are unavailable.

When CSI is reported, some or all subbands of the bandwidth part may be allocated and used as a CSI reporting band (CSI reporting band), to report CSI corresponding to the CSI reporting band. For ease of description, the CSI reporting band is referred to as a reporting band for short below. It is not difficult to understand that the reporting band is a segment of band, and CSI corresponding to the band needs to be reported. The band includes a plurality of subbands. The reporting band carries a reference signal that is sent by a transmit end device and that is used to perform channel measurement. The reference signal is, for example, but is not limited to a cell-specific reference signal (Cell-specific Reference Signal, CRS), a channel state information reference signal (Channel State Information Reference Signal, CSI-RS), or a demodulation reference signal (Demodulation Reference Signal, DMRS). Related technical content of the reference signal belongs to the prior art, and is not limited in this embodiment of the present invention. A receive end device may measure the reference signal to obtain corresponding CSI. During implementation of CSI reporting, CSI of an entire reporting band may be reported, in other words, wideband CSI of the reporting band is reported, or CSI of at least one subband in the reporting band may be reported, or the foregoing two reporting manners may be used in combination, or another reporting manner may be used. As shown in FIG. 1, the reporting band includes a plurality of contiguous subbands. However, in a specific implementation process, subbands included in the reporting band may be non-contiguous. For example, for six contiguous subbands in a bandwidth part, namely, a subband 1 to a subband 6, the reporting band may include the subband 1, the subband 2, the subband 4, and the subband 6. In a specific implementation process, the frequency band may alternatively be allocated in another manner or in another hierarchy. For example, a quantity of subcarriers included in the subband may vary in different allocation manners. For another example, at least one hierarchy may be added or deleted between frequency band allocation hierarchies shown in FIG. 1. A specific manner of frequency band allocation is not limited in this embodiment of the present invention.

During channel measurement, the receive end device obtains channel state information based on the reference signal (Reference Signal, RS) transmitted by the transmit end device, and feeds back the obtained CSI to the transmit end device. The transmit end device may process a transmit signal based on the CSI, and send the processed transmit signal to the receive end device. In a specific implementation process, the CSI may further include, for example, but not limited to, at least one of the following information: a channel quality indicator (Channel Quality Indicator, CQI), a precoding matrix indicator (Precoding Matrix Indicator, PMI), a CSI-RS resource indicator (CSI-RS Resource Indicator, CRI), or a rank indication (Rank Indication, RI). When processing the transmit signal, the transmit end device may directly use the CSI fed back by the receive end device for processing, or may adjust the CSI fed back by the receive end device, and use the adjusted CSI for processing. For example, in a specific implementation process, the transmit end device may decrease an RI fed back by the receive end device, and perform processing by using the decreased RI. For another example, the transmit end device may further reconstruct a precoding matrix corresponding to a PMI fed back by the receive end device, and perform processing by using the reconstructed PMI. The reconstruction process may be, for example, but is not limited to, orthogonalizing precoding matrices corresponding to PMIs fed back by a plurality of simultaneously scheduled receive end devices. A method for simultaneously scheduling a plurality of receive end devices to perform data transmission is also referred to as a multi-user multiple-input and multiple-output (Multi-User Multiple-Input and Multiple-Output (MIMO), MU-MIMO) technology. For another example, the transmit end device may decrease a CQI fed back by the receive end device, and perform processing by using the decreased CQI. It should be noted that, if the transmit end device adjusts the CSI fed back by the receive end device, the transmit end device may need to notify the receive end device of the adjusted CSI, so that the receive end device restores the transmit signal from a received signal based on the adjusted CSI. For example, if a base station adjusts the RI or the CQI, the base station needs to notify the receive end device of the adjusted RI and the adjusted CQI. In a specific implementation process, a specific manner in which the transmit end device adjusts the CSI fed back by the receive end device is not limited in this embodiment of the present invention.

When a relatively large amount of subband CSI needs to be fed back, large overheads are caused. Embodiments of the present invention provide a technical solution. For cases in which subbands in a reporting band are contiguous subbands and non-contiguous subbands, solutions to reporting subband selection are separately provided. This helps reduce the overheads. The technical solutions provided in the embodiments of the present invention are described in detail below with reference to the accompanying drawings and specific embodiments.

Figure 2:
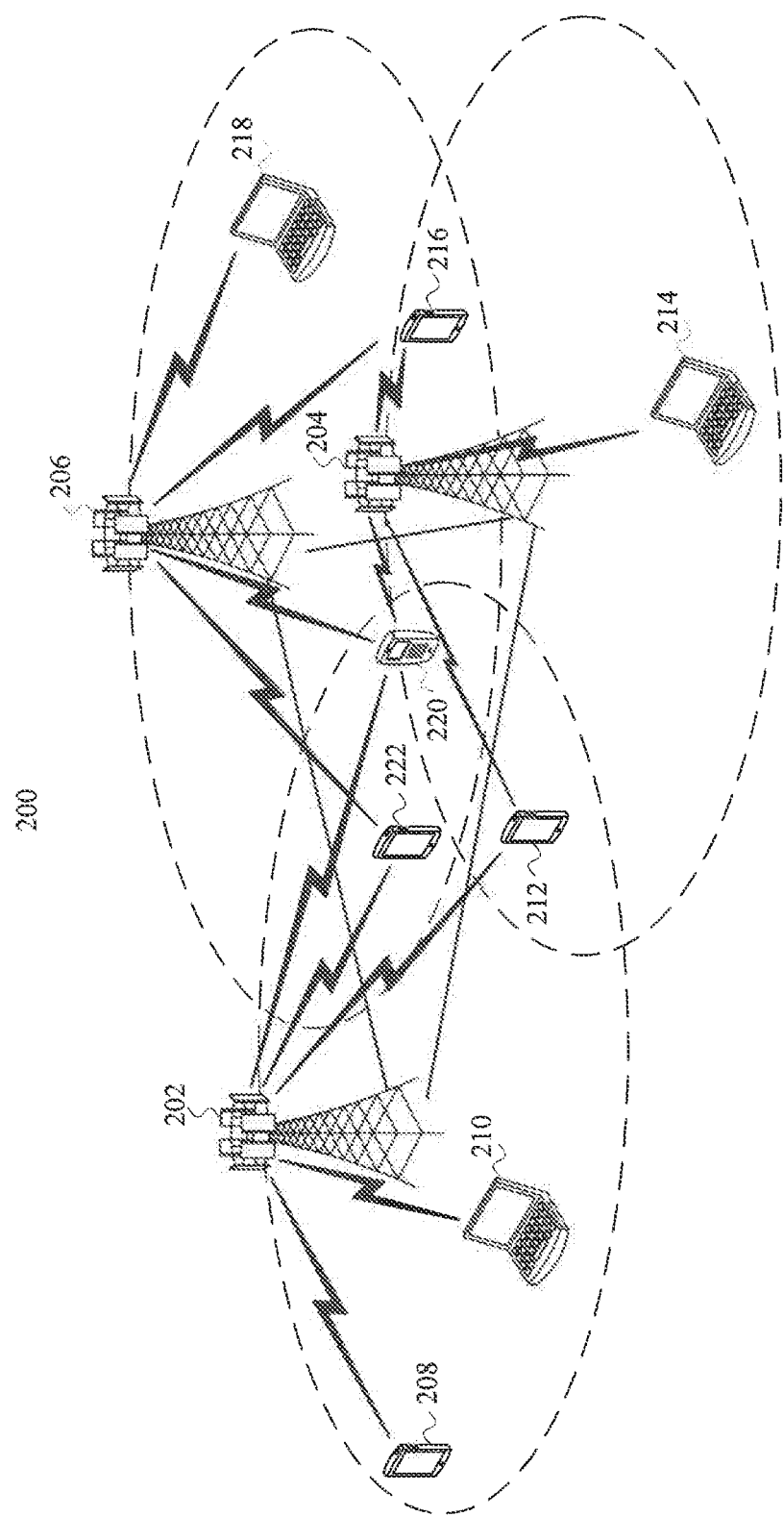
FIG. 2 is an example schematic diagram of a wireless communications network according to an embodiment of the present invention.

FIG. 2 is an example schematic diagram of a wireless communications network 200 according to an embodiment of the present invention. As shown in FIG. 2, the wireless communications network 200 includes base stations 202 to 206 and terminal devices 208 to 222. The base stations 202 to 206 may communicate with each other by using a backhaul (backhaul) link (as indicated by straight lines between the base stations 202 to 206). The backhaul link may be a wired backhaul link (such as an optical fiber or a copper cable), or may be a wireless backhaul link (such as a microwave). The terminal devices 208 to 222 may communicate with the corresponding base stations 202 to 206 by using radio links (as indicated by broken lines between the base stations 202 to 206 and the terminal devices 208 to 222).

The base stations 202 to 206 are usually used as access devices to provide a wireless access service for the terminal devices 208 to 222 that are usually used as user equipment. Specifically, each base station corresponds to a service coverage area (which may also be referred to as a cell, as indicated by each oval area in FIG. 2). The terminal device entering the area may communicate with the base station by using a radio signal, to accept the radio access service provided by the base station. Service coverage areas of the base stations may overlap. A terminal device in an overlapping area may receive radio signals from a plurality of base stations. Therefore, these base stations may coordinate with each other, to provide a service for the terminal device. For example, the plurality of base stations may provide the service for the terminal device in the overlapping area by using a coordinated multipoint (Coordinated multipoint, CoMP) technology. For example, as shown in FIG. 2, there is an overlapping area between service coverage areas of the base station 202 and the base station 204, and the terminal device 222 is located within the overlapping area, so that the terminal device 222 may receive radio signals from the base station 202 and the base station 204. The base station 202 and the base station 204 may coordinate with each other to provide a service for the terminal device 222. For another example, as shown in FIG. 2, there is a common overlapping area between service coverage areas of the base station 202, the base station 204, and the base station 206, and the terminal device 220 is located within the overlapping area, so that the terminal device 220 may receive radio signals from the base stations 202, 204, and 206. The base stations 202, 204, and 206 may coordinate with each other to provide a service for the terminal device 220.

Depending on a used wireless communications technology, a base station may also be referred to as a NodeB (NodeB), an evolved NodeB (evolved NodeB, eNodeB), an access point (Access Point, AP), or the like. In addition, depending on a size of a provided service coverage area, base stations may be classified into a macro base station for providing a macro cell (Macro cell), a micro base station for providing a microcell, a femto base station for providing a femto cell (Femto cell), and the like. As the wireless communications technologies keep evolving, another name may be used for a future base station.

The terminal devices 208 to 222 may be various wireless communications devices with a wireless communication function, for example, but not limited to, a mobile cellular phone, a cordless phone, a personal digital assistant (Personal Digital Assistant, PDA), a smartphone, a notebook computer, a tablet computer, a wireless data card, a wireless modem, or a wearable device such as a smartwatch. As the Internet of Things (Internet of Things, IOT) technology emerges, more devices that originally do not have a communication function are equipped with a wireless communications unit to obtain a wireless communication function, for example, include but are not limited to a household appliance, a transportation vehicle, a tool device, a service device, and a service facility. In this way, these devices can access a wireless communications network and accept remote control. This type of device is equipped with the wireless communications unit and therefore has the wireless communication function. Therefore, this type of device is also a type of wireless communications device. In addition, the terminal devices 208 to 222 may also be referred to as mobile stations, mobile devices, mobile terminals, wireless terminals, handheld devices, clients, and the like.

The base stations 202 to 206 and the terminal devices 208 to 222 each may be equipped with a plurality of antennas, to support a MIMO (multiple-input multiple-output, Multiple-Input Multiple-Output) technology. Further, the base stations 202 to 206 and the terminal devices 208 to 222 may not only support a single-user MIMO (Single-User MIMO, SU-MIMO) technology but also multi-user MIMO (Multi-User MIMO, MU-MIMO). The MU-MIMO may be implemented based on a space division multiple access (Space Division Multiple Access, SDMA) technology. Equipped with a plurality of antennas, the base stations 202 to 206 and the terminal devices 208 to 222 may further flexibly support a single-input single-output (Single-Input Single-Output, SISO) technology, a single-input multiple-output (SingleInput MultipleOutput, SIMO) technology, and a multiple-input single-output (MultipleInput SingleOutput, MISO) technology, to implement various diversity (for example, but not limited to, transmit diversity and receive diversity) and multiplexing technologies. The diversity technology may include, for example, but not limited to, a transmit diversity (Transmit Diversity, TD) technology and a receive diversity (Receive Diversity, RD) technology. The multiplexing technology may be a spatial multiplexing (Spatial Multiplexing) technology. In addition, the foregoing technologies may further include a plurality of implementation solutions. For example, the transmit diversity technology may include, for example, but not limited to, diversity manners such as space-time transmit diversity (Space-Time Transmit Diversity, STTD), space-frequency transmit diversity (Space-Frequency Transmit Diversity, SFTD), time-switched transmit diversity (Time-Switched Transmit Diversity, TSTD), frequency switched transmit diversity (Frequency Switched Transmit Diversity, FSTD), orthogonal transmit diversity (Orthogonal Transmit Diversity, OTD), and cyclic delay diversity (Cyclic Delay Diversity, CDD), and diversity manners obtained by deriving, evolving, and combining the foregoing diversity manners. For example, currently, transmit diversity manners such as space time block coding (Space Time Block Coding, STBC), space frequency block coding (Space Frequency Block Coding, SFBC), and the CDD are used in an LTE (long term evolution, Long Term Evolution) standard. A general description of transmit diversity is provided above by using examples. A person skilled in the art should understand that, in addition to the foregoing examples, transmit diversity is further implemented in a plurality of other manners. Therefore, the foregoing descriptions should not be understood as limitations on the technical solutions of the present invention, and it should be understood that the technical solutions of the present invention are applicable to various possible transmit diversity solutions.

In addition, the base stations 202 to 206 and the terminal devices 208 to 222 may communicate with each other by using various wireless communications technologies, for example, but not limited to, a time division multiple access (Time Division Multiple Access, TDMA) technology, a frequency division multiple access (Frequency Division Multiple Access, FDMA) technology, a code division multiple access (Code Division Multiple Access, CDMA) technology, a time division-synchronous code division multiple access (Time Division-Synchronous Code Division Multiple Access, TD-SCDMA) technology, an orthogonal frequency division multiple access (Orthogonal FDMA, OFDMA) technology, a single carrier frequency division multiple access (Single Carrier FDMA, SC-FDMA) technology, and a space division multiple access (Space Division Multiple Access, SDMA) technology, and evolved and derived technologies of these technologies. The foregoing wireless communications technologies, as radio access technologies (Radio Access Technology, RAT), are adopted by many wireless communication standards, to construct various wireless communications systems (or networks) that are widely known today and include but are not limited to a global system for mobile communications (Global System for Mobile Communications, GSM), CDMA2000, wideband CDMA (Wideband CDMA, WCDMA), Wi-Fi defined in the 802.22 series standards, worldwide interoperability for microwave access (Worldwide Interoperability for Microwave Access, WiMAX), long term evolution (Long Term Evolution, LTE), LTE-advanced (LTE-Advanced, LTE-A), and evolved systems of these wireless communications systems. Unless otherwise specified, the technical solutions provided in the embodiments of the present invention may be applied to the foregoing various wireless communications technologies and wireless communications systems. In addition, the terms "system" and "network" may be replaced with each other.

It should be noted that the wireless communications network 200 shown in FIG. 2 is merely an example, and is not intended to limit the technical solutions of the present invention. A person skilled in the art should understand that in a specific implementation process, the wireless communications network 200 may further include another device, and a quantity of base stations and a quantity of terminal devices may further be configured based on a specific requirement.

In a specific implementation process, access devices such as the base stations 202 to 206 shown in FIG. 2 may be used as the transmit end devices, and user equipment such as the terminal devices 208 to 222 shown in FIG. 2 may be used as the receive end devices.

Figure 3:
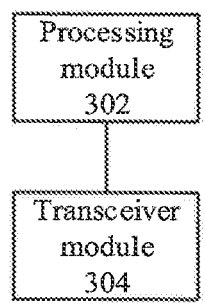
FIG. 3 is an example schematic diagram of a logical structure of a communications device according to an embodiment of the present invention.

FIG. 3 is an example schematic diagram of a logical structure of a communications device 300 according to an embodiment of the present invention. The communications device 300 may be configured to implement a receive end device, or may be configured to implement a transmit end device. As shown in FIG. 3, the communications device 300 includes a processing module 302 and a transceiver module 304. Specific functions of these modules are described in detail below. In a specific implementation process, the processing module 302 may be implemented by using a processor 402 in a communications device 400 to be described below, or may be implemented by using a processor 402 and a memory 408 in a communications device 400, or certainly, may be implemented in another manner. Similarly, the transceiver module 304 may be implemented by using a transceiver 404 in the communications device 400, or certainly may be implemented in another manner.

Figure 4:
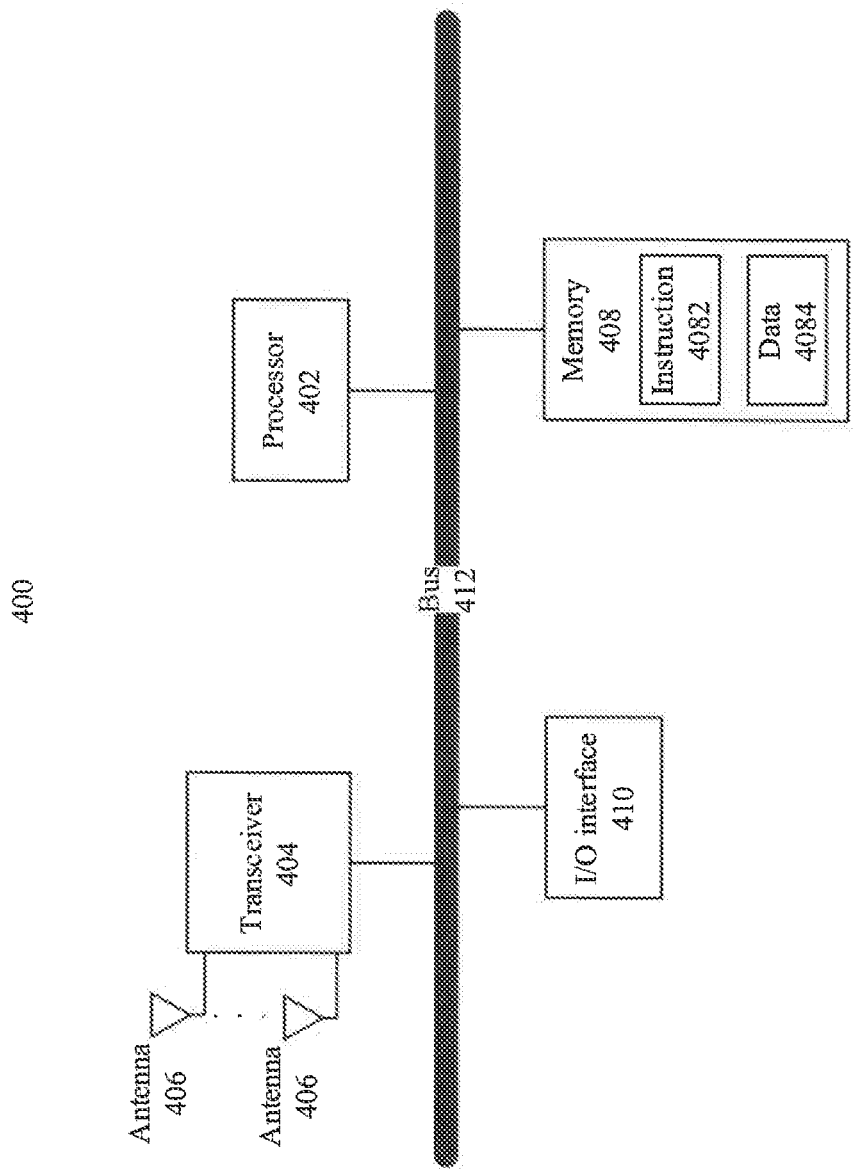
FIG. 4 is an example schematic diagram of a hardware structure of a communications device according to an embodiment of the present invention.

FIG. 4 is an example schematic diagram of a hardware structure of a communications device 400 according to an embodiment of the present invention, The communications device 400 may be configured to implement a receive end device, or may be configured to implement a transmit end device. As shown in FIG. 4, the communications device 400 includes a processor 402, a transceiver 404, a plurality of antennas 406, a memory 408, an I/O (input/output, Input/Output) interface 410, and a bus 412. The memory 408 is further configured to store an instruction 4082 and data 4084. In addition, the processor 402, the transceiver 404, the memory 408, and the I/O interface 410 are communicatively connected to each other by using the bus 412, and the plurality of antennas 406 are connected to the transceiver 404. In a specific implementation process, the processor 402, the transceiver 404, the memory 408, and the I/O interface 410 may alternatively be communicatively connected to each other in another connection manner other than the bus 412.

The processor 402 may be a general purpose processor, and the general purpose processor may be a processor that performs a specific step and/or operation by reading and executing an instruction (for example, the instruction 4082) stored in a memory (for example, the memory 408), and in a process of performing the foregoing step and/or operation, the general purpose processor may use data (for example, the data 4084) stored in a memory (for example, the memory 408). The general purpose processor may be, for example, but is not limited to, a central processing unit (Central Processing Unit, CPU). In addition, the processor 402 may alternatively be a dedicated processor. The dedicated processor may be a processor specially designed to perform a specific step and/or operation. The dedicated processor may be, for example, but is not limited to, a digital signal processor (Digital Signal Processor, DSP), an application-specific integrated circuit (Application-Specific Integrated Circuit, ASIC), and a field programmable gate array (Field Programmable Gate Array, FPGA). In addition, the processor 402 may further be a combination of a plurality of processors, for example, a multi-core processor.

The transceiver 404 is configured to receive and send a signal, and a specific process of receiving and sending the signal is performed by using at least one of the plurality of antennas 406.

The memory 408 may be various types of storage media, for example, a random access memory (Random Access Memory, RAM), a read-only memory (Read-Only Memory, ROM), a non-volatile RAM (Non-volatile RAM, NVRAM), a programmable ROM (Programmable ROM, PROM), an erasable PROM (Erasable PROM, EPROM), an electrically erasable PROM (Electrically Erasable PROM, EEPROM), a flash memory, an optical memory, and a register. The memory 408 is specifically configured to store the instruction 4082 and the data 4084. When the memory 402 is a general purpose processor, the processor 402 may perform a specific step and/or operation by reading and executing the instruction 4082 stored in the memory 408, and in a process of performing the foregoing step and/or operation, the data 4084 may need to be used.

The I/O interface 410 is configured to receive an instruction and/or data from a peripheral device, and output an instruction and/or data to the peripheral device.

In a specific implementation process, the processor may be configured to perform, for example, but not limited to, baseband-related processing, and the transceiver may be configured to perform, for example, but not limited to, radio frequency transmission. The foregoing components may be separately disposed on chips that are independent of each other, or at least some or all of the components may be disposed on a same chip. For example, the processor may be further classified into an analog baseband processor and a digital baseband processor. The analog baseband processor and the transceiver may be integrated on a same chip, and the digital baseband processor may be disposed on an independent chip. With continuous development of integrated circuit technologies, more components may be integrated on a same chip. For example, a digital baseband processor and a plurality of application processors (for example, but not limited to a graphics processing unit and a multimedia processor) may be integrated on a same chip. Such a chip may be referred to as a system on chip (System on Chip). Whether the components are independently disposed on different chips, or are disposed on one or more chips in an integrated manner usually depends on a specific requirement of a product design. A specific implementation form of the foregoing components is not limited in this embodiment of the present invention.

It should be noted that, in a specific implementation process, the communications device 400 may further include other hardware components, which are not listed one by one in this specification.

Figure 5:
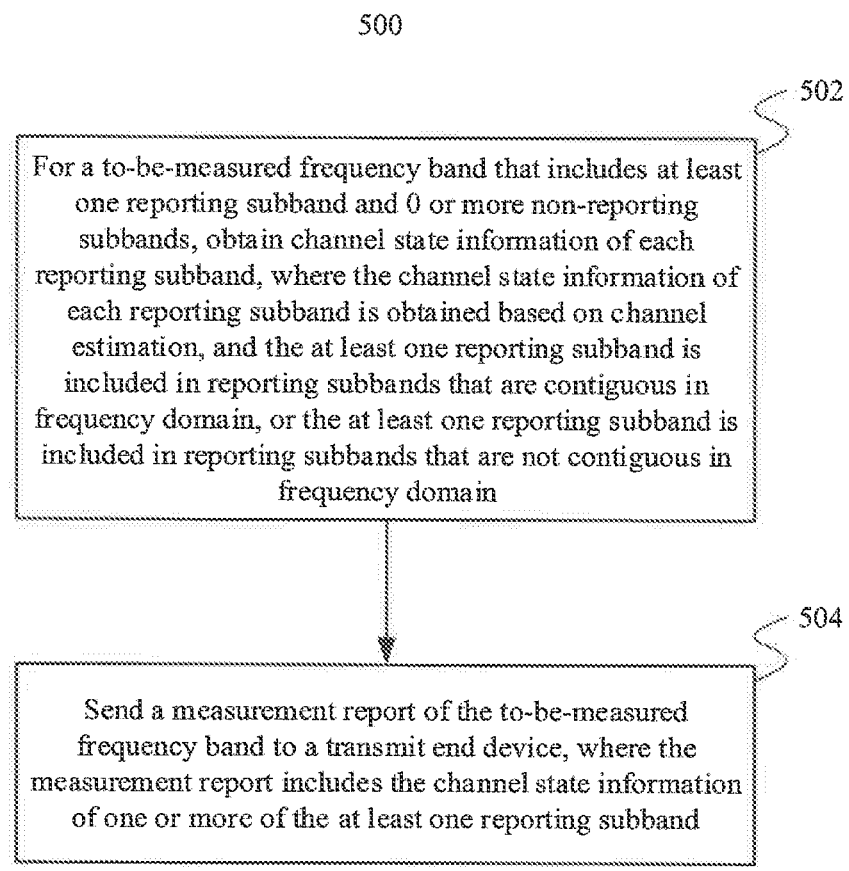
FIG. 5 is an example flowchart of a channel measurement method according to an embodiment of the present invention.

Specific functions of hardware components in the communications device 400 are described in detail below, FIG. 5 is an example flowchart of a channel measurement method 500 according to an embodiment of the present invention. In a specific implementation process, the method 500 may be performed by a receive end device. The receive end device may be implemented by the communications device 300 shown in FIG. 3 and the communications device 400 shown in FIG. 4.

Step 502: For a to-be-measured frequency band that includes at least one reporting subband and 0 or more non-reporting subbands, obtain channel state information of one or more reporting subbands, where the channel state information of each reporting subband is obtained based on channel estimation, and the at least one reporting subband is included in reporting subbands that are contiguous in frequency domain, or the at least one reporting subband is included in reporting subbands that are not contiguous in frequency domain. It should be noted that, in all embodiments of the present invention, the non-reporting subband may also be referred to as a missing subband, a default subband, or an omitted subband, and the non-reporting subband indicates a subband whose channel state information does not need to be reported.

In a specific implementation process, step 502 may be performed by the processing module 302 and the processor 402.

Step 504: Send a measurement report of the to-be-measured frequency band to a transmit end device, where the measurement report includes the channel state information of the one or more of the at least one reporting subband.

In a specific implementation process, step 504 may be performed by the transceiver module 304 and the transceiver 404.

The to-be-measured frequency band may include a plurality of subbands, and the subbands may be contiguous, not contiguous, or partially contiguous. Whether the subbands are contiguous and a contiguous form are not limited in this embodiment of the present invention. In a specific implementation process, the to-be-measured frequency band may be the reporting band described above, or may be greater than the reporting band described above. In other words, in this embodiment of this application, the reporting band may be indicated not only by using only reporting band indication information, but also implicitly by using the to-be-measured frequency band. In other words, a bandwidth range of the reporting band keeps consistent with a bandwidth range occupied for measuring a resource.

Compared with a fed-back measurement report that includes channel state information of each subband, the measurement report fed back in this embodiment of the present invention includes only channel state information of some subbands, and the subbands are contiguous subbands in frequency domain or non-contiguous subbands in frequency domain. Therefore, feedback overheads caused by channel measurement are reduced.

A plurality of subbands included in the to-be-measured frequency band may be classified into two types, which are reporting subbands and non-reporting subbands. In addition, in the to-be-measured frequency band, the reporting subband includes at least one subband, and a quantity of the non-reporting subbands may be greater than or equal to 0. When the quantity of the non-reporting subbands is equal to 0, all subbands included in the to-be-measured frequency band are reporting subbands. In addition, the channel state information of the reporting subband is obtained based on channel estimation, and channel state information of the non-reporting subband may be obtained based on the channel state information of the reporting subband. In addition, the channel state information of the reporting subband is included in the measurement report and sent to the transmit end device, and a part of the channel state information of the non-reporting subband is not sent to the transmit end device or none of the channel state information of the non-reporting subband is sent to the transmit end device.

Figure 6:
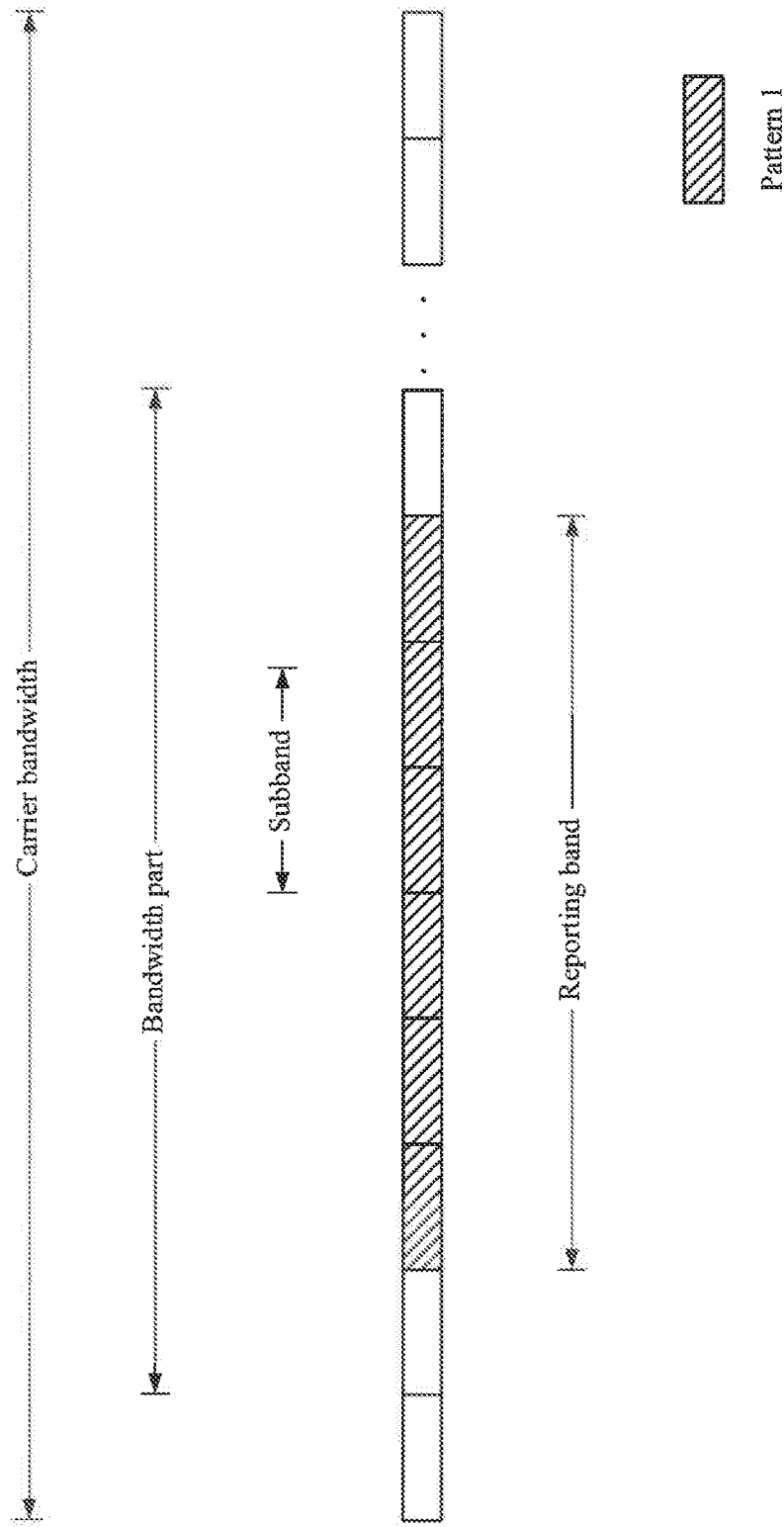
FIG. 6 is a schematic diagram of frequency band allocation according to another embodiment of the present invention.
Figure 7:
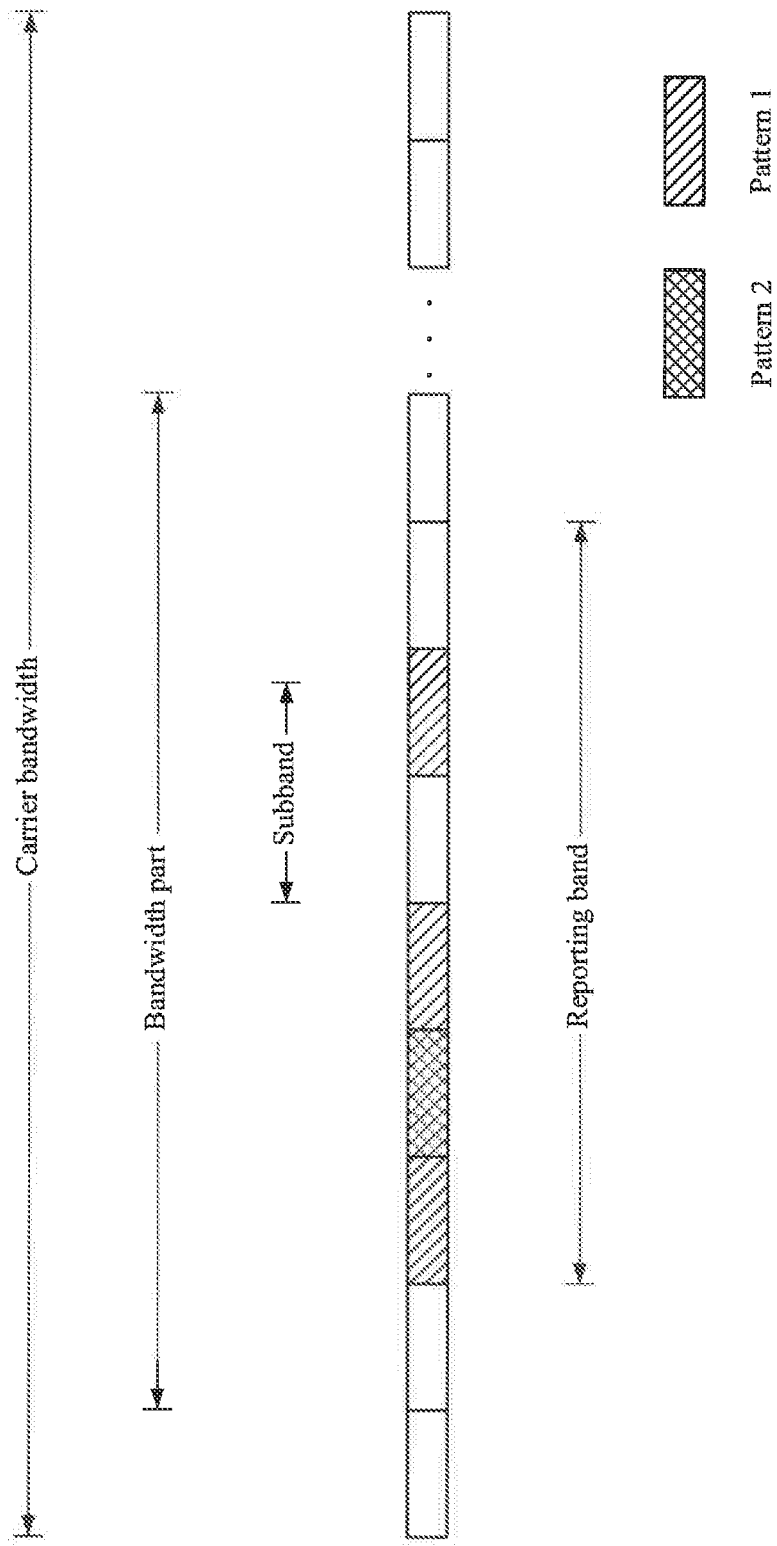
FIG. 7 is a schematic diagram of frequency band allocation according to still another embodiment of the present invention.

For ease of understanding, refer to FIG. 6 and FIG. 7 to understand the to-be-measured frequency band provided in this embodiment of the present invention. In FIG. 6 and FIG. 7, the to-be-measured frequency band is specifically reflected as the reporting band. For specific content of the carrier bandwidth, the bandwidth part, the subband, and the reporting band, refer to the foregoing description with reference to FIG. 1. Further, in FIG. 6, the reporting band includes six subbands, namely, six subbands spanned by the reporting band. In these subbands, six subbands indicated by a pattern 1 are contiguous subbands, and CSI of all the six subbands needs to be reported. The six subbands are referred to as reporting subbands. In FIG. 7, although the reporting band spans six subbands, one subband indicated by a pattern 2 is not a part of the reporting band. Therefore, the reporting band includes only five subbands, other than the subband indicated by the pattern 2, of the six subbands spanned by the reporting band. In addition, in FIG. 7, three subbands indicated by a pattern 1 are reporting subbands, and the other two subbands are non-reporting subbands.

In the method 500, the channel state information of the non-reporting subband may be obtained with reference to the channel state information of the reporting subband. Therefore, the channel state information of the non-reporting subband and the channel state information of the reporting subband may be of a same type, and channel state information of this type may be, for example, but is not limited to, one of a CQI, a PMI, an RI, or a CRI. It should be noted that, in a specific implementation process, the receive end device may feed back a plurality of types of channel state information of subbands included in the to-be-measured frequency band to the transmit end device, and each type of channel state information may be reported with reference to the method 500.

If the non-reporting subband is determined by the receive end device by autonomously searching for locally prestored configuration information, for example, locally prestored reporting subband configuration information, a person skilled in the art should understand that an indication for the reporting subband may be included in the measurement report or another message. In a specific implementation process, there are a plurality of indication manners, for example, but are not limited to, an implicit indication, an explicit indication, a direct indication, an indirect indication, or a combination of the foregoing indication manners. For example, the direct indication means that to-be-indicated information is directly indicated. For example, the non-reporting subband is directly indicated. The indirect indication means that the to-be-indicated information is indicated by indicating other information. For example, the non-reporting subband is indicated by indicating the reporting subband. On the contrary, the reporting subband may also be indirectly indicated by indicating the non-reporting subband. In this embodiment of this application, a manner of indicating the reporting subband is mainly used as an example for description. That the reporting subband is indirectly indicated by indicating the non-reporting subband is a mirror mapping process. This may be easily achieved by a person skilled in the art. In addition, for a specific implementation of the foregoing indications, refer to the prior art. This is not limited in the present invention. It should be noted that the foregoing description of the indication manners is also applicable to another indication mentioned in this specification.

Further, the reporting subband may also be specified by the transmit end device and indicated to the receive end device. In this case, the method 500 may further include:

receiving reporting subband configuration information from the transmit end device or searching for locally prestored reporting subband configuration information, where the reporting subband configuration information is used to indicate a reporting band and a subband that is a reporting subband in the reporting band; and determining the at least one reporting subband based on the reporting subband configuration information.

In a specific implementation process, the step of receiving reporting subband configuration information from the transmit end device may be performed by the transceiver module 304 and the transceiver 404, and the steps of searching for locally prestored reporting subband configuration information and determining the at least one reporting subband based on the reporting subband configuration information may be performed by the processing module 302 and the processor 402. It should be noted that the reporting subband configuration process may be used as a part of the method 500, or the method 500 may be used as a part of the foregoing process.

If a plurality of subbands in the reporting band are grouped into a plurality of groups, in a specific case, the reporting subband configuration information may be replaced with reporting subband group configuration information. The reporting subband group configuration information is used to indicate a subband group that is a reporting subband group in the reporting band. The reporting subband configuration information or the reporting subband group configuration information is used to indicate the at least one reporting subband or at least one reporting subband group, and may be specifically used to indicate reporting subbands or reporting subband groups one by one, or indicate a reporting subband configuration scheme or a reporting subband group configuration scheme. It is not difficult to understand that in the former solution, the indication manner is more flexible, but indication overheads are larger, and in the latter solution, indication overheads are smaller, but the indication manner is relatively fixed. When the reporting subband configuration scheme or the reporting subband group configuration scheme is used, a plurality of reporting subband configuration schemes or reporting subband group configuration schemes may be agreed upon in a communication standard. In addition, the reporting subband configuration schemes or the reporting subband group configuration schemes may be written into the receive end device and the transmit end device in advance before delivery, in this way, in a process in which the receive end device interacts with the transmit end device, the reporting subband or the reporting subband group is indicated by transferring an index of the reporting subband configuration scheme or an index of the reporting subband group configuration scheme. In addition, the plurality of non-reporting subband configuration schemes may also be configured by the transmit end device for the receive end device in an interaction process (for example, an initial access process) between the transmit end device and the receive end device. In this case, the method 500 may further include:

receiving reporting subband configuration information or reporting subband group configuration information from the transmit end device, where the reporting subband configuration information or the reporting subband group configuration information includes a plurality of reporting subband configuration schemes or reporting subband group configuration schemes, and a reporting subband that includes a plurality of reporting subbands or a plurality of reporting subband groups is recorded in each configuration scheme; and determining the plurality of reporting subband configuration schemes or the plurality of reporting subband group configuration schemes based on the reporting subband configuration information or the reporting subband group configuration information.

In a specific implementation process, the step of receiving reporting subband configuration information from the transmit end device may be performed by the transceiver module 304 and the transceiver 404, and the step of determining the plurality of reporting subband configuration schemes based on the reporting subband configuration information may be performed by the processing module 302 and the processor 402. It should be noted that the reporting subband configuration process may be used as a part of the method 500, or the method 500 may be used as a part of the foregoing process.

In a specific implementation process, the reporting subband configuration information or the reporting subband group configuration information may be sent by using one of the following signaling:

physical layer signaling;
media access control layer signaling; and
radio resource control signaling.

Usually, a sending period of the reporting subband configuration information or the reporting subband group configuration information is relatively long. Therefore, the reporting subband configuration information or the reporting subband group configuration information may be transmitted preferentially by using the media access control layer signaling or the radio resource control signaling.

Still further, the reporting subband may also be specified in the communication standard in advance. It is not difficult to understand that, compared with a manner of indicating the reporting subband, a manner of specifying the reporting subband in the communication standard is used, so that signaling overheads caused by the indication are reduced.

The measurement report may be transmitted by using one message, or may be transmitted by using a plurality of messages. A specific transmission manner is not limited in this embodiment of the present invention. In addition, a plurality of pieces of information of the same type (for example, channel state information) may be included in the measurement report independently, or may be included in the measurement report in an interrelated manner, or may be included in the measurement report in another manner. For example, the interrelated manner may be a differential manner. For example, a specific including manner is not limited in this embodiment of the present invention.

If the reporting subband needs to be frequently or dynamically indicated, the reporting subband configuration information or the reporting subband group configuration information may be transmitted preferentially by using the physical layer signaling.

The physical layer signaling is also referred to as layer 1 (Layer 1, L1) signaling, and may usually be carried by a control part in a physical layer frame. A typical example of the L1 signaling is downlink control information (Downlink Control Information, DCI) carried on a physical downlink control channel (Physical Downlink Control Channel, PDCCH) defined in the LTE standard. In some cases, the L1 signaling may alternatively be carried by a data part in the physical layer frame. It is not difficult to learn that a sending period or a signaling period of the L1 signaling is usually a period of the physical layer frame. Therefore, such signaling is usually used to implement dynamic control, to transfer some information that changes frequently. For example, resource allocation information may be transferred by using the physical layer signaling.

The media access control (Media Access Control, MAC) layer signaling pertains to layer 2 (L2) signaling, and may usually be carried by, for example, but not limited to, a frame header of an LS2 frame. The frame header may further carry, for example, but not limited to, information such as a source address and a destination address. In addition to the frame header, the L2 frame usually further includes a frame body. In some cases, the L2 signaling may alternatively be carried by the frame body of the L2. A typical example of the L2 signaling is signaling carried in a frame control (Frame Control) field in a frame header of a MAC frame in the 802.11 series standards, or a MAC control entity (Control Entity, MAC-CE) defined in some protocols. The L2 frame may be usually carried in the data part of the physical layer frame. The reporting subband indication information or non-reporting subband indication information may also be sent by using other L2 signaling other than the media access control layer signaling.

The radio resource control (Radio Resource Control, RRC) signaling pertains to layer 3 (L3) signaling, and is usually some control messages. The L3 signaling may usually be carried by the frame body of the L2 frame. A sending period or a control period of the L3 signaling is usually relatively long, so that the L3 signaling is suitable for being used to send information that does not change frequently. For example, in some existing communication standards, the L3 signaling is usually used to carry some configuration information. The reporting subband configuration information or the reporting subband group configuration information may also be sent by using other L3 signaling other than the RRC signaling.

The foregoing description is merely a principle description of the physical layer signaling, the MAC layer signaling, the RRC signaling, the layer 1 signaling, the L2 signaling, and the L3 signaling. For specific details about the various types of signaling, refer to the prior art. Therefore, details are not described herein.

In the reporting subband configuration scheme described above, the reporting subband configuration information includes reporting band indication information and reporting subband indication information. When subbands are grouped, the reporting subband group configuration information includes reporting band indication information and reporting subband group indication information. In addition, for each non-reporting subband, the receive end device may also obtain channel state information of the non-reporting subband through channel estimation, but the channel state information is still not sent to the transmit end device. In addition, the transmit end device may autonomously set the channel state information of the non-reporting subband. In other words, when setting the channel state information of the non-reporting subband, the transmit end device may not consider an actual channel environment. It is not difficult to understand that this design solution can reduce feedback overheads caused by channel measurement.

After obtaining the channel state information of the non-reporting subband, the transmit end device may further adjust the channel state information. Content related to the adjustment has been clearly described above, and therefore details are not described herein again.

The channel state information of the to-be-measured frequency band may be a CQI. The channel state information of each reporting subband and the channel state information of each non-reporting subband may be PMIs. Alternatively, the channel state information of each reporting subband and the channel state information of each non-reporting subband may also be CQIs. A person skilled in the art should understand that, in addition to calculating the channel state information of the to-be-measured frequency band based on the channel state information of each reporting subband and the channel state information of each non-reporting subband, the channel state information of the to-be-measured frequency band may alternatively be calculated by using another method, for example, but not limited to, calculating the channel state information of the to-be-measured frequency band by using the to-be-measured frequency band as a whole. Content related to this belongs to the prior art, and details are not described in this embodiment of the present invention. If the channel-related information is the channel state information of the to-be-measured frequency band, and a type of the channel state information is the same as those of the channel state information of each reporting subband and the channel state information of each non-reporting subband, the channel state information of the to-be-measured frequency band and the channel state information of each reporting subband may be reported in a differential manner. Specifically, the channel state information of the to-be-measured frequency band, and a difference between the channel state information of each reporting subband and the channel state information of the to-be-measured frequency band may be reported.

In a specific implementation process, specific content of the channel-related information is not limited in this embodiment of the present invention.

Figure 8:
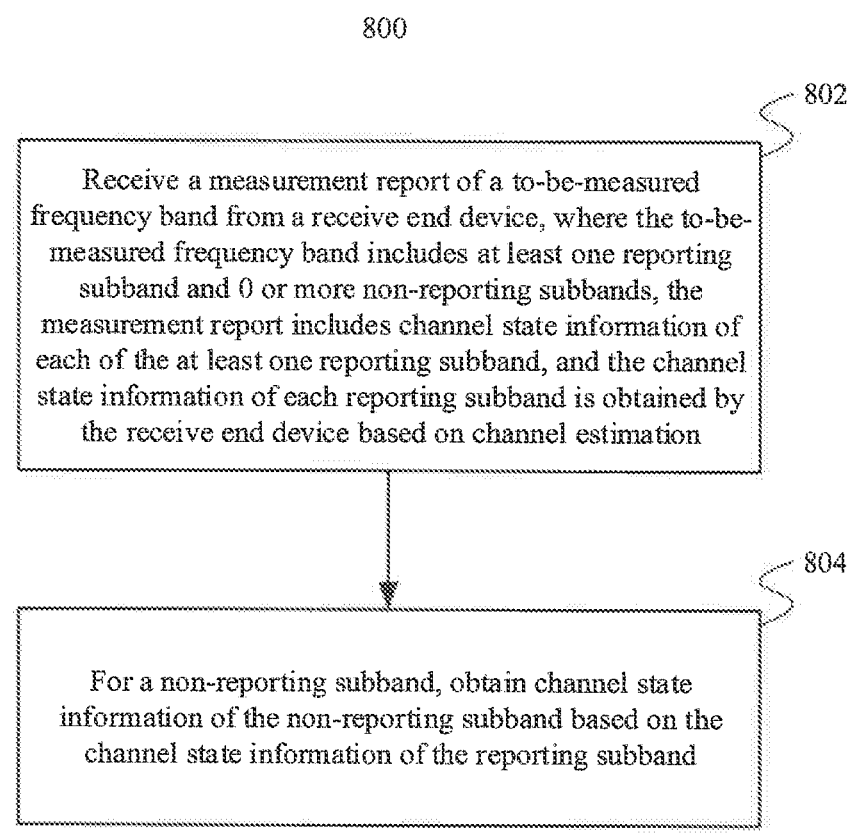
FIG. 8 is an example flowchart of a channel measurement method according to an embodiment of the present invention.

FIG. 8 is an example flowchart of a channel measurement method 800 according to an embodiment of the present invention. In a specific implementation process, the method 800 may be performed by a transmit end device. The transmit end device may be implemented by the communications device 300 shown in FIG. 3 and the communications device 400 shown in FIG. 4.

Step 802: Receive a measurement report of a to-be-measured frequency band from a receive end device, where the to-be-measured frequency band includes at least one reporting subband and 0 or more non-reporting subbands, the measurement report includes channel state information of one or more of the at least one reporting subband, and channel state information of each reporting subband is obtained by the receive end device based on channel estimation.

In a specific implementation process, step 802 may be performed by the transceiver module 304 and the transceiver 404.

Step 804: For a non-reporting subband, obtain channel state information of the non-reporting subband based on the channel state information of the reporting subband.

In a specific implementation process, step 804 may be performed by the processing module 302 and the processor 402.

The method 800 corresponds to the method 600, and related technical content has been described in detail above with reference to the method 500. Therefore, details are not described herein again.

Implementation processes of the present invention are further described below with reference to actual examples.

Embodiment 1

In this embodiment, that reporting subband configuration information is used to indicate, based on a bitmap, a reporting band and a subband that is a reporting subband in the reporting band is described.

In Embodiment 1, the reporting subband configuration information includes reporting subband indication information. When an explicit indication is used, the reporting subband configuration information may further include reporting band indication information.

The reporting band indication information is used to configure a bandwidth range of the reporting band (CSI reporting band). Certainly, the reporting band indication information is not explicitly indicated, but is implicitly indicated by using a to-be-measured frequency band. In other words, the bandwidth range of the reporting band keeps consistent with a bandwidth range occupied for measuring a resource.

The reporting subband indication information is used to indicate that, within the bandwidth range of the CSI reporting band, a bit is in a one-to-one correspondence with a subband, and a reporting band that includes contiguous or non-contiguous subbands is determined by using a bitmap configuration.

Figure 9:
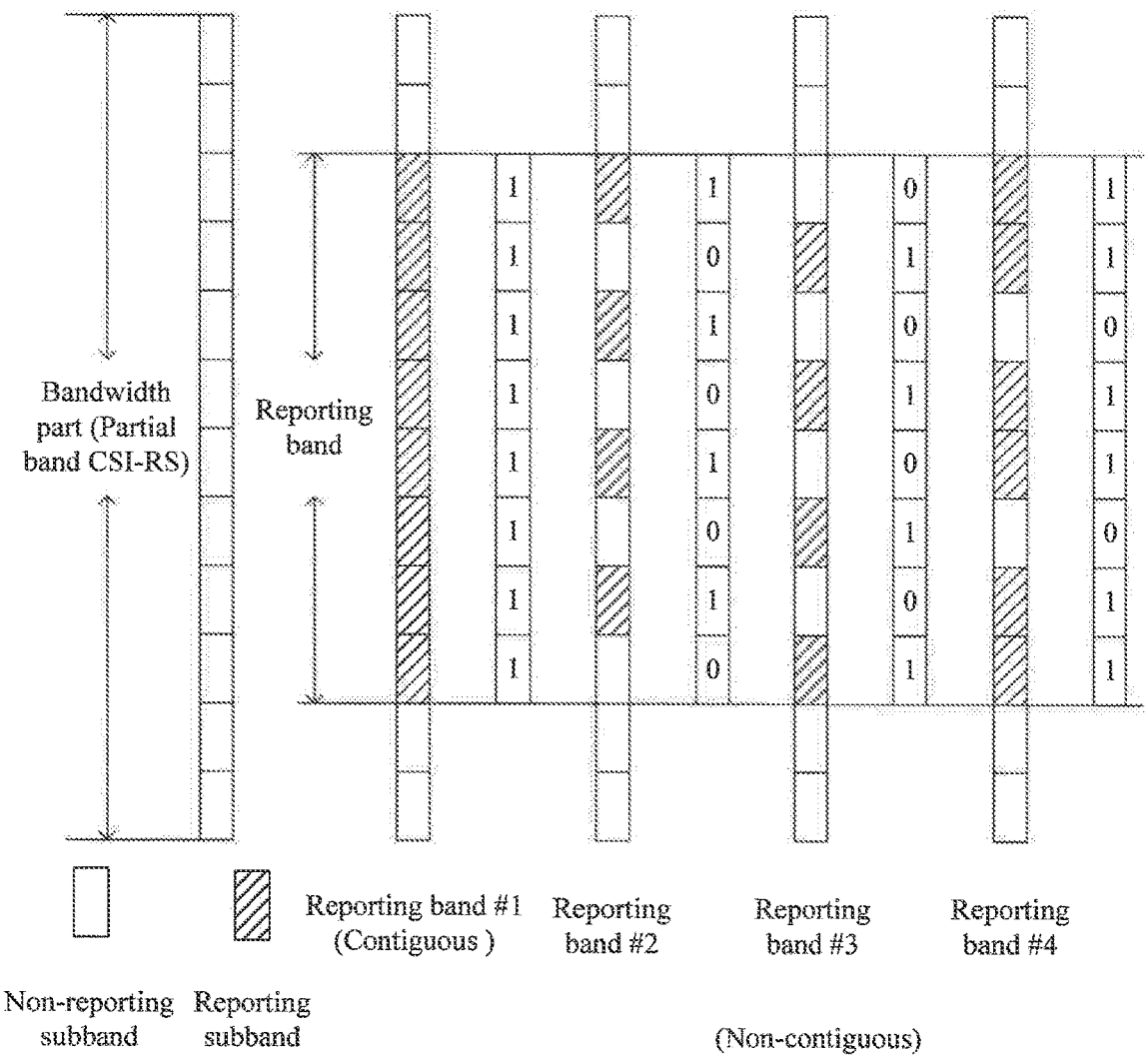
FIG. 9 is a schematic diagram of frequency band allocation according to another embodiment of the present invention.

Details are shown in FIG. 9.

In an explicit indication manner, the reporting band indication information indicates a start position of a reporting subband and a quantity of the reporting subbands, or indicates a start position and an end position of a reporting subband. That is, a frequency range that is of the CSI reporting band and that is indicated by the reporting band indication information may be one of the following manners.

It is assumed that a bandwidth part includes Y RBs in total, and the reporting band indication information is represented by using (N1, N2):

Solution 1: N1 indicates the start position of the subband, and the start position is indicated by a start RB index (index); and N2 indicates the end position of the subband, and the end position is indicated by an RB index (index) of the end position.

For example, Y=100 and (N1=10, N2=89) indicate that on 0 to 99, that is, 100 contiguous RBs, the $10^{th}$ RB to the $89^{th}$ RB, that is, X=80 RBs, form the frequency range of the CSI reporting. A value of Y may be determined by CSI-RS bandwidth, $$X=(N2-N1+1), \text{ and } 0 \leq N1 \leq N2 \leq (Y-1).$$

Solution 2: N1 indicates the start position of the subband, and the start position is indicated by the start RB index (index); and N2 indicates the quantity of the subbands.

For example, Y=100 and (N1=10, N2=80) indicate that on 0 to 99, that is, 100 contiguous RBs, the $10^{th}$ RB to the $89^{th}$ RB, that is, X=80 RBs, form the frequency range of the CSI reporting, A value of Y may be determined by CSI-RS bandwidth, $$X=N2, 0 \leq N1 \leq (Y-1), \text{ and } 1 \leq N2 \leq (Y-N1).$$

Solution 3: N11 indicates a start position of a first subband, the start position is indicated by the start RB index (index), N12 indicates an end position of the first subband, and the end position is indicated by an RB index (index) of the end position; and N21 indicates a start position of a second subband, the start position is indicated by the start RB index (index), N22 indicates an end position of the second subband, and the end position is indicated by the RB index (index) of the end position, where $0 \leq N11 \leq N12 \leq N21 \leq N22 \leq (Y-1)$.

Solution 4: N11 indicates a start position of a first subband, the start position is indicated by the start RB index (index), and N12 indicates a quantity of the first subbands; and N21 indicates a start position of a second subband, the start position is indicated by the start RB index (index), and N22 indicates a quantity of the second subbands, where $0 \leq N11 < N21 \leq (Y-1)$, $1 \leq N12 \leq (Y-N11)$, and $1 \leq N22 \leq (Y-N21)$.

When only solution 1 or solution 2 is configured, a system may consider by default that the CSI reporting band includes subbands that are all contiguous.

When only solution 3 or solution 4 is configured, a system may consider by default that the CSI reporting band includes subbands that are partially contiguous.

The CSI reporting band may be configured in the following manner (assuming that X RBs correspond to Z subbands).

A Z-bit bitmap is used, where each bit is in a one-to-one correspondence with one subband in the Z subbands. Specifically, as shown in FIG. 9, assuming that Z=8, the bitmap is as follows:

Z7 Z6 Z5 Z4 Z3 Z2 Z1 Z0.

A most significant bit Z7 of the bitmap corresponds to a subband 0 in the Z subbands, and the subbands are arranged in ascending order, so that a least significant bit Z0 corresponds to a subband 7 (alternatively, the most significant bit Z7 of the bitmap corresponds to the subband 7 in the Z subbands, and the subbands are arranged in descending order, so that the least significant bit Z0 corresponds to the subband 0). For details, refer to FIG. 9.

The reporting subband indication information includes a first information bitmap, and the first information bitmap is used to indicate the reporting subband and a non-reporting subband in the reporting band.

Optionally, all subbands in the reporting band may be reporting subbands, or some subbands are reporting subbands, and some subbands are non-reporting subbands. The reporting subband may be indicated by an information bit 1, and the non-reporting subband is indicated by an information bit 0. Alternatively, the reporting subband is indicated by the information bit 0, and the non-reporting subband is indicated by the information bit 1. For example, the first information bitmap is Z7 Z6 Z5 Z4 Z3 Z2 Z1 Z0. During specific implementation, a first type of first information bitmap is indicated as 11111111; a second type of first information bitmap is indicated as 10101010; a third type of first information bitmap is indicated as 01010101; and a fourth type of first information bitmap is indicated as 11011011.

Optionally, a quantity of bits of the first information bitmap is the same as a quantity of actual reporting subbands, and all bits in the first information bitmap are used to indicate the reporting subband and the non-reporting subband; or a quantity of the first information bits is the same as a maximum quantity of reporting subbands that is allowed by the system, and some or all bits in the first information bitmap are used to indicate the reporting subband and the non-reporting subband.

A beneficial effect of Embodiment 1 lies in that flexible configuration of selection of contiguous or non-contiguous subbands can be supported. Because different interferences exist in a specific application scenario, a network side can flexibly configure, based on prior information and the foregoing design, a subband on which reporting needs to be reported, so as to properly avoid a frequency range with potential strong interference, thereby ensuring reporting quality of CSI such as a CQI.

Embodiment 2

In an implementation of Embodiment 2, subbands in a reporting band may be further grouped in advance. According to an instruction of a transmit end device or a locally prestored grouping rule, subbands in a bandwidth part are grouped into groups by allocating several subbands in one group. A method in Embodiment 2 includes:

receiving subband group indication information, where the subband group indication information includes a first parameter A, and the first parameter A indicates that one subband group includes A contiguous subbands; and dividing the reporting band into B subband groups based on the first parameter A.

A reporting subband group configuration information is represented by using a second information bitmap, and the second information bitmap is used to indicate a subband group that is a reporting subband group in the B subband groups; and contiguous reporting subbands include contiguous reporting subband groups in the B subband groups, or non-contiguous reporting subbands include non-contiguous reporting subband groups in the B subband groups.

A quantity of the second information bitmaps is the same as a quantity of actual reporting subband groups, and all bits in the second information bitmap are used to indicate the reporting subband group and a non-reporting subband group; or a quantity of the second information bitmaps is the same as a maximum quantity of reporting subband groups that is allowed by a system, and some or all bits in the second information bitmap are used to indicate the reporting subband group and a non-reporting subband group.

Specifically, the first parameter A is used to indicate that one subband group includes A contiguous subbands. Assuming that bandwidth may accommodate B subband groups, composition of the subband group in the reporting band is indicated by using a B-bit bitmap.

For example:

if A=1, it indicates that one subband is one subband group, and for an implementation of the B-bit bitmap, refer to Embodiment 1; and if A=2, it indicates that every two subbands form one subband group, and for an implementation of the B-bit bitmap, refer to Embodiment 1.

Figure 10:
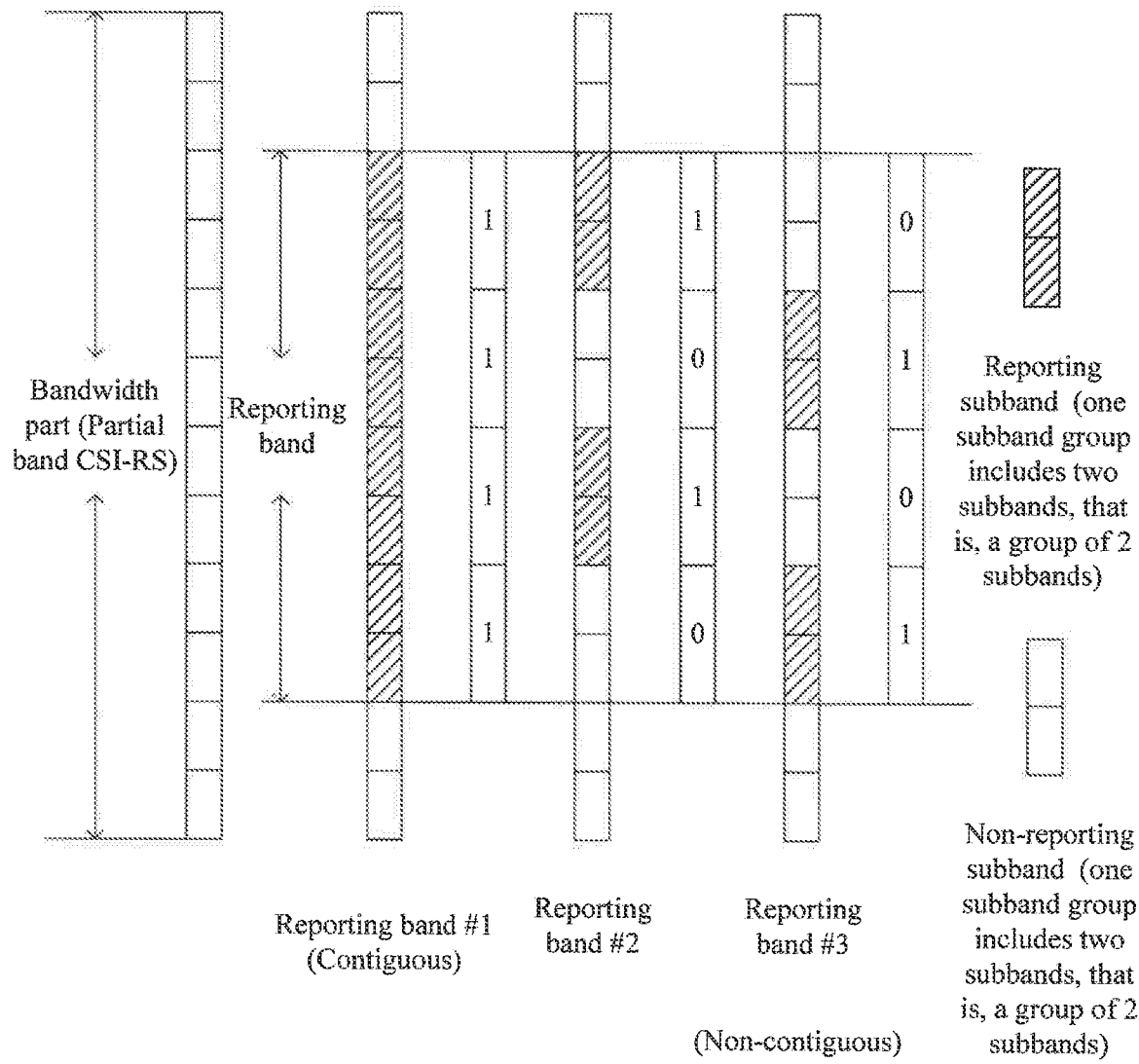
FIG. 10 is a schematic diagram of frequency band allocation according to another embodiment of the present invention.

For example, in FIG. 10, two subbands are grouped into one group, that is, A=2, so that the subbands are grouped into four subband groups, that is, B=4. The transmit end device indicates the reporting subband group configuration information in a bitmap manner. In this case, a receive end device may perform reporting by selecting a subband group based on locally prestored reporting subband group configuration information or the reporting subband group configuration information sent by the transmit end device.

In Embodiment 2, the second information bitmap is indicated as 1111, 1010, or 0101.

An implementation process of the second information bitmap is similar to that in Embodiment 1, and details are not described herein again.

It should be noted that the subbands may be equally grouped, or may not be equally grouped. In other words, provided that a plurality of subbands are grouped into a plurality of groups in advance, a quantity of subbands in each group may be the same or may be different. The subband grouping principle is also applicable to other embodiments of this application.

A beneficial effect of implementing Embodiment 2 of the present invention lies in that, based on the foregoing solution, subband (group) selection whose granularity is configurable is further supported. A plurality of subbands are configured into one subband group, so that a bitmap size can be effectively reduced, and a proper compromise is achieved between configuration flexibility and configuration efficiency.

Embodiment 3

In Embodiment 3, a bitmap table-based dynamic subband selection and switching solution is described.

Based on Embodiment 1, with reference to dynamic reporting mechanisms such as aperiodic CSI reporting (Aperiodic CSI reporting, A-CSI) and semi-persistent CSI reporting (Semi-persistent CSI reporting, S-CSI), dynamic switching of subband selection may be implemented by using the following solution.

A plurality of bitmaps with a same length (Z-bit) are configured in higher layer signaling to form a bitmap table, and a subband subset used by current CSI reporting is indicated by using dynamic signaling.

In this case, a receive end device needs to receive the dynamic signaling. The dynamic signaling is implemented by using DCI or a MAC CE. The dynamic signaling includes a third information bitmap, and the third information bitmap is used to indicate an index of the first information bitmap; and the reporting subband and the non-reporting subband that are indicated by the first information bitmap are selected based on an index indicator of the third information bitmap.

Figure 11:
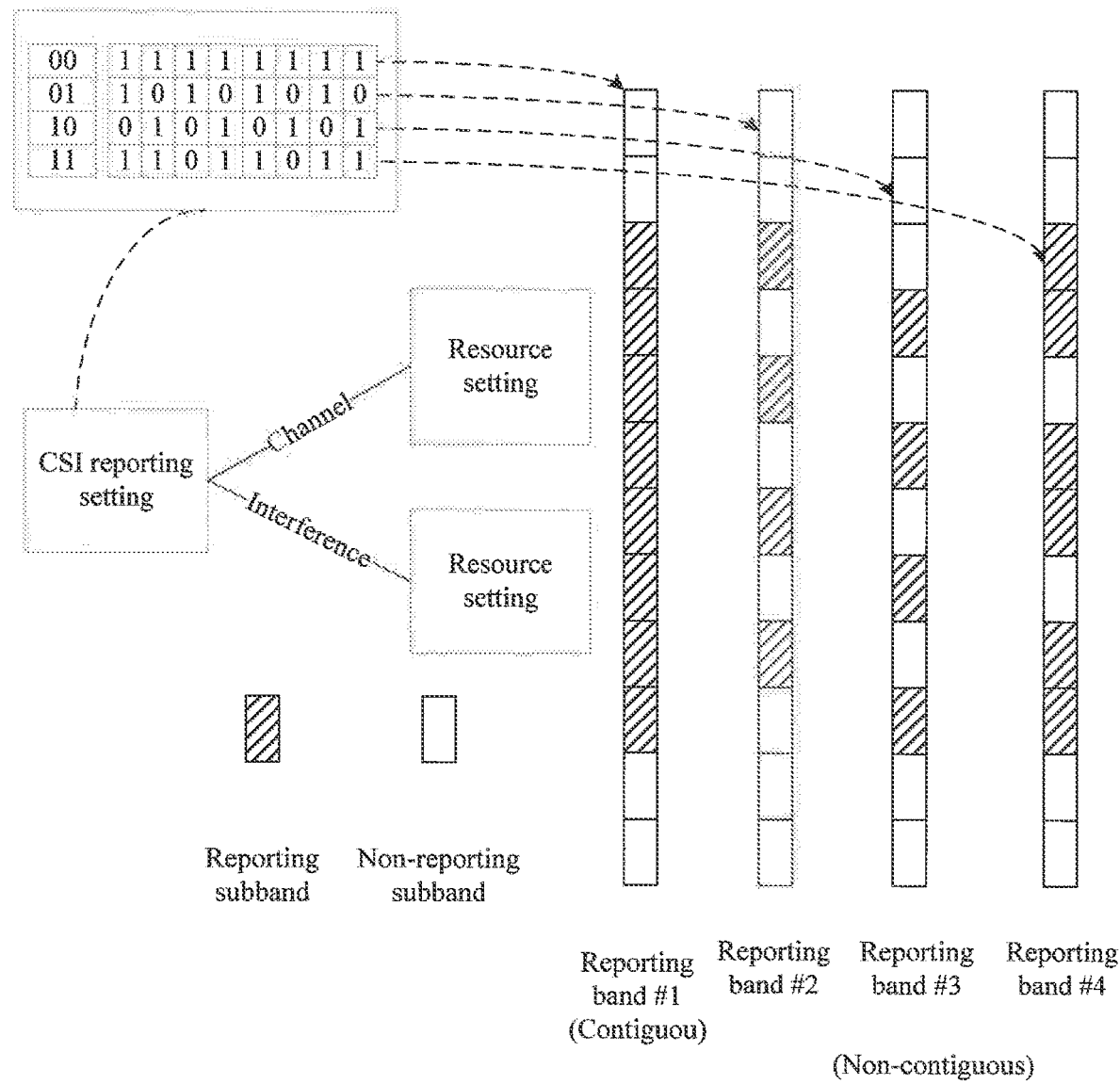
FIG. 11 is a schematic diagram of frequency band allocation according to another embodiment of the present invention.

Details are shown in FIG. 11

It is assumed that M first information bits (bitmap) are configured to respectively correspond to M candidate subband subsets, and one of the M subband subsets is selected as a currently used subband subset by using an index indicator indicated by the third information bitmap carried in the dynamic signaling (the DCI or the MAC CE). A quantity of third information bitmaps is ($[\log_2 M]$).

For example, if M=8, the quantity of the third information bitmaps is 3, that is, $[\log_2 M]=3$. To be specific, the third information bitmap is specifically 00, 01, 10, 11, 00 represents the first information bitmap 11111111, that is, all subbands in a reporting band are reporting subbands. 01 is used to represent 10101010, which indicates that the first subband, the third subband, the fifth subband, and the seventh subband in a reporting band are reporting subbands, and the second subband, the fourth subband, the sixth subband, and the eighth subband are non-reporting subbands. 10 is used to represent 0101010101, which indicates that the first subband, the third subband, the fifth subband, and the seventh subband in a reporting band are non-reporting subbands, and the second subband, the fourth subband, the sixth subband, and the eighth subband are reporting subbands. 11 is used to represent 11011011, which indicates that the first subband, the second subband, the fourth subband, the fifth subband, the seventh subband, and the eighth subband are reporting subbands, and the third subband and the sixth subband are non-reporting subbands.

Because a subband size changes with a width of an active bandwidth part, a quantity of the subbands also changes accordingly. In the bitmap configuration process represented by using the first information bitmap, the bitmap size (including a quantity of bits) may be processed in the following manners.

If the bitmap size is changeable, the bitmap size is determined based on the width of the active bandwidth part and a quantity of subbands that is derived based on the subband size.

If the bitmap size is fixed, the bitmap size is determined based on a maximum quantity of subbands that is allowed by a system. For different types of bandwidth, some or all bits in the bitmap are occupied for configuration.

A beneficial effect of Embodiment 3 lies in that flexible configuration of selection of contiguous or non-contiguous subbands can be supported. Dynamic switching of subband subsets in an A-CSI/S-CSI reporting process can be supported by combining a dynamic signaling indication.

For periodic CSI reporting, the foregoing bitmap table solution may also be used. In this case, the system uses, by default, a CSI reporting band indicated by a first bitmap in the bitmap table. In this case, the third information bitmap does not need to be used for indication.

Embodiment 4

In Embodiment 4, a bitmap table-based dynamic subband grouping selection and switching solution is described.

Based on Embodiment 2, with reference to dynamic reporting mechanisms such as aperiodic CSI reporting (Aperiodic CSI reporting, A-CSI) and semi-persistent CSI reporting (Semi-persistent CSI reporting, S-CSI), dynamic switching of subband selection may be implemented by using the following solution.

A plurality of bitmaps with a same length (Z-bit) are configured in higher layer signaling to form a bitmap table, and a subband group subset used by current CSI reporting is indicated by using dynamic signaling.

In this case, a receive end device needs to receive the dynamic signaling. The dynamic signaling is implemented by using DCI or a MAC CE. The dynamic signaling includes a third information bitmap, and the third information bitmap is used to indicate an index of the second information bitmap; and a reporting subband group or non-reporting subband group indicated by the second information bitmap are selected based on an index indicator of the third information bitmap.

Figure 12:
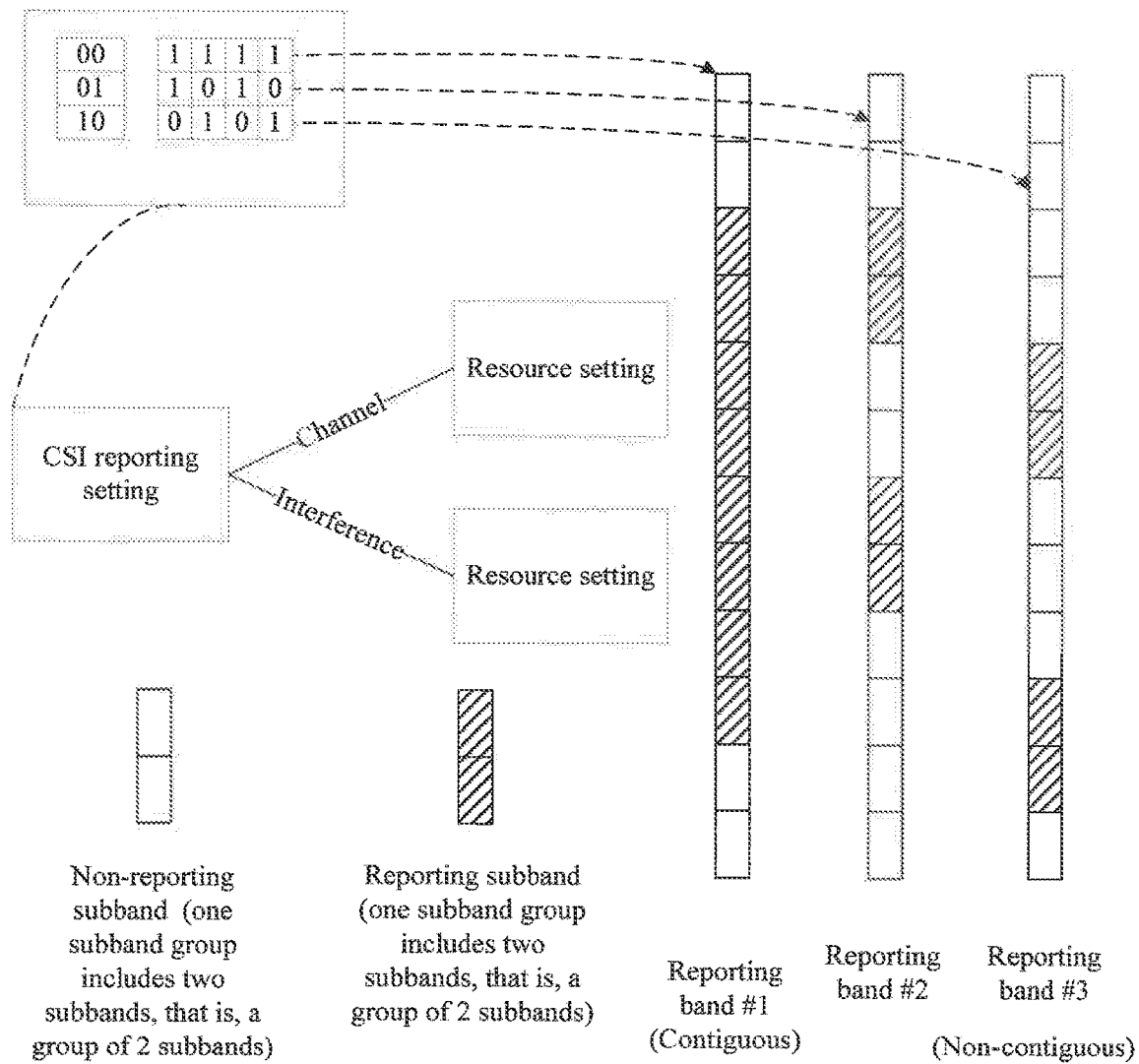
FIG. 12 is a schematic diagram of frequency band allocation according to another embodiment of the present invention.

Details are shown in FIG. 12.

It is assumed that M second information bitmaps (bitmap) are configured to respectively correspond to M candidate subband group subsets, and one of the M subband group subsets is selected as a currently used subband group subset by using an index indicator indicated by the third information bitmap carried in the dynamic signaling (the DCI or the MAC CE). A quantity of third information bitmaps is ($[\log_2 M]$).

For example, if M=4, the quantity of bits of third information bitmap is equal to 2, that is, $[\log_2 M]=2$. To be specific, the third information bitmap is specifically 00, 01, 10, and 00 represents the first information bitmap 1111, that is, all subband groups in a reporting band are reporting subband groups. 01 is used to represent 1010, which indicates that the first subband group and the third subband group in a reporting band are reporting subband groups, and the second subband group and the fourth subband group are non-reporting subband groups. 10 is used to represent 01010, which indicates that the first subband group and the third subband group in a reporting band are non-reporting subband groups, and the second subband group and the fourth subband group are reporting subband groups.

A beneficial effect of Embodiment 4 lies in that flexible configuration of selection of contiguous or non-contiguous subbands can be supported. On the basis of grouping the subbands, dynamic switching of subband subsets in an A-CSI/S-CSI reporting process can be supported by combining a dynamic signaling indication.

Embodiment 5

Configuration and indication methods based on a predefined pattern:

In Embodiment 5, reporting subband configuration information includes reporting subband start position indication information and reporting subband decimation indication information; the reporting subband start position indication information is used to indicate a start position of a reporting subband; and the reporting subband decimation indication information is used to instruct to decimate, from the start position of the reporting subband or from an offset of O subbands, the first N subbands or the last N subbands from every M contiguous subbands as reporting subbands.

In a possible implementation, the reporting subband start position indication information indicates the start position of the reporting band by using a first parameter (such as a subband index offset), and the reporting subband decimation indication information may indicate a specific subband decimation manner by using a second parameter (such as a decimation ratio).

Figure 13:
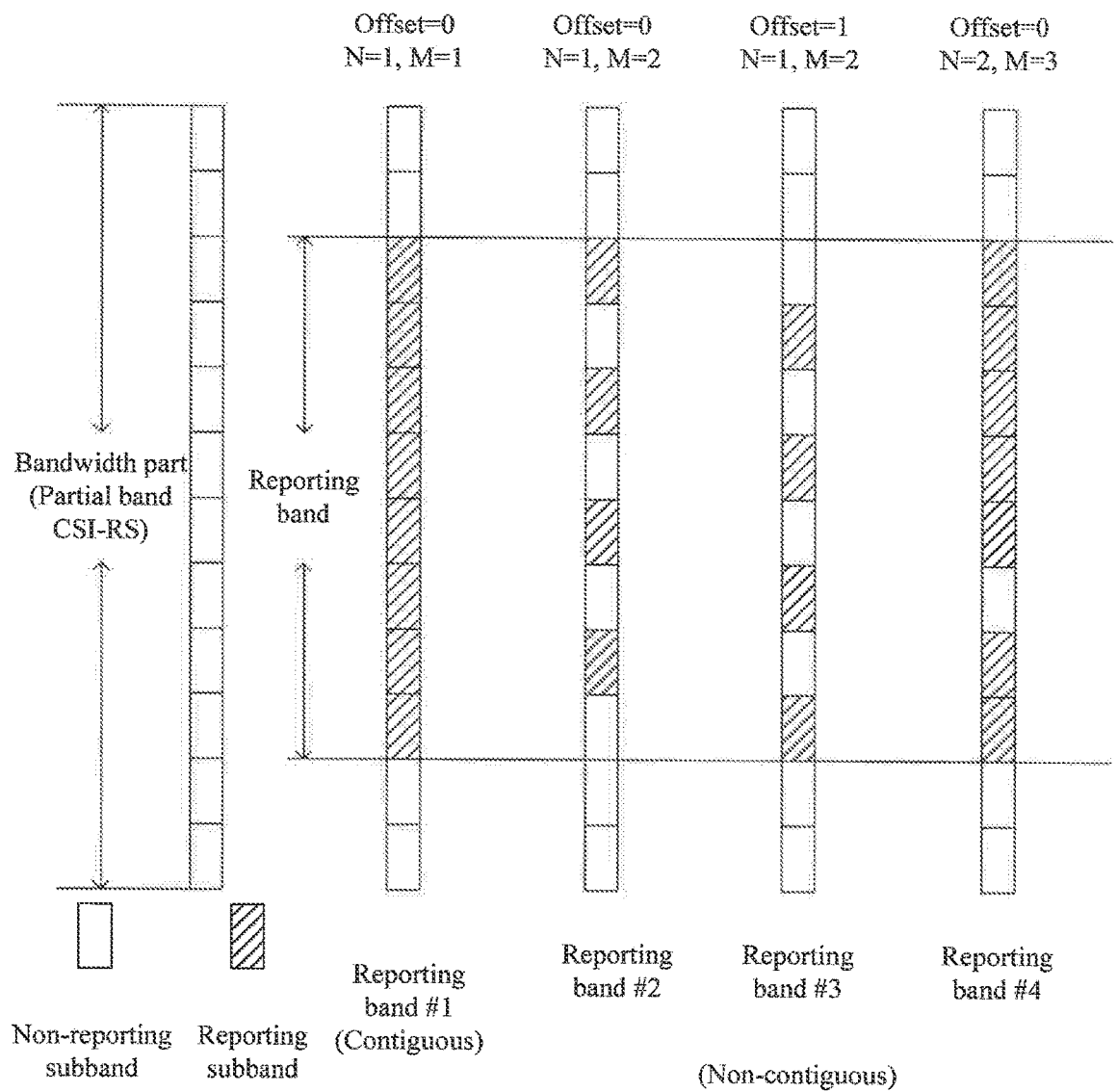
FIG. 13 is a schematic diagram of frequency band allocation according to another embodiment of the present invention.

For example, as shown in FIG. 13, the decimation ratio is equal to N/M, to be specific, the first N subbands are decimated from every M contiguous subbands to form a reporting band.

If N=1, M=1, and offset=0, it indicates that a reporting band includes contiguous subbands that start from the first subband, If N=1, M=2, and offset=0, it indicates that from the first subband, the first subband is decimated from every two contiguous subbands to form a reporting band. A reporting subband and a non-reporting subband may be parity-related. In other words, a subband whose sequence number is an odd number is decimated as the reporting subband, and a subband whose sequence number is an even number is used as the non-reporting subband. Certainly, the subband whose sequence number is an even number may alternatively be decimated as the reporting subband, and the subband whose sequence number is an odd number is used as the non-reporting subband.

If N=1, M=2, and offset=1, it indicates that one subband is offset from the first subband, that is, starting from the second subband, the first subband is decimated from every two contiguous subbands to form a reporting band.

If N=2, M=3, and offset=0, it indicates that starting from the first subband, the first two subbands are decimated from every three contiguous subbands to form a reporting band.

A beneficial effect of Embodiment 5 of the present invention lies is that configuration complexity is further reduced, and a measurement reporting solution by using which feedback overheads are reduced is supported in a specific scenario. For example, when channel frequency selectivity is weak and coherence bandwidth is relatively wide, a frequency spacing for subband decimation may be increased.

Embodiment 6

Configuration and indication methods based on a predefined pattern:

In Embodiment 6, reporting subband group configuration information includes reporting subband group start position indication information and reporting subband group decimation indication information; the reporting subband group start position indication information is used to indicate a start position of a reporting subband group; and the reporting subband group decimation indication information is used to instruct to decimate, from the start position of the reporting subband group or from an offset of O subband groups, the first N subband groups or the last N subband groups from every M contiguous subband groups as reporting subband groups.

In a possible implementation, the reporting subband group start position indication information indicates the start position of the reporting band by using a first parameter (such as a subband group index offset), and the reporting subband group decimation indication information may indi-cate a specific subband group decimation manner by using a second parameter (such as a decimation ratio).

Figure 14:
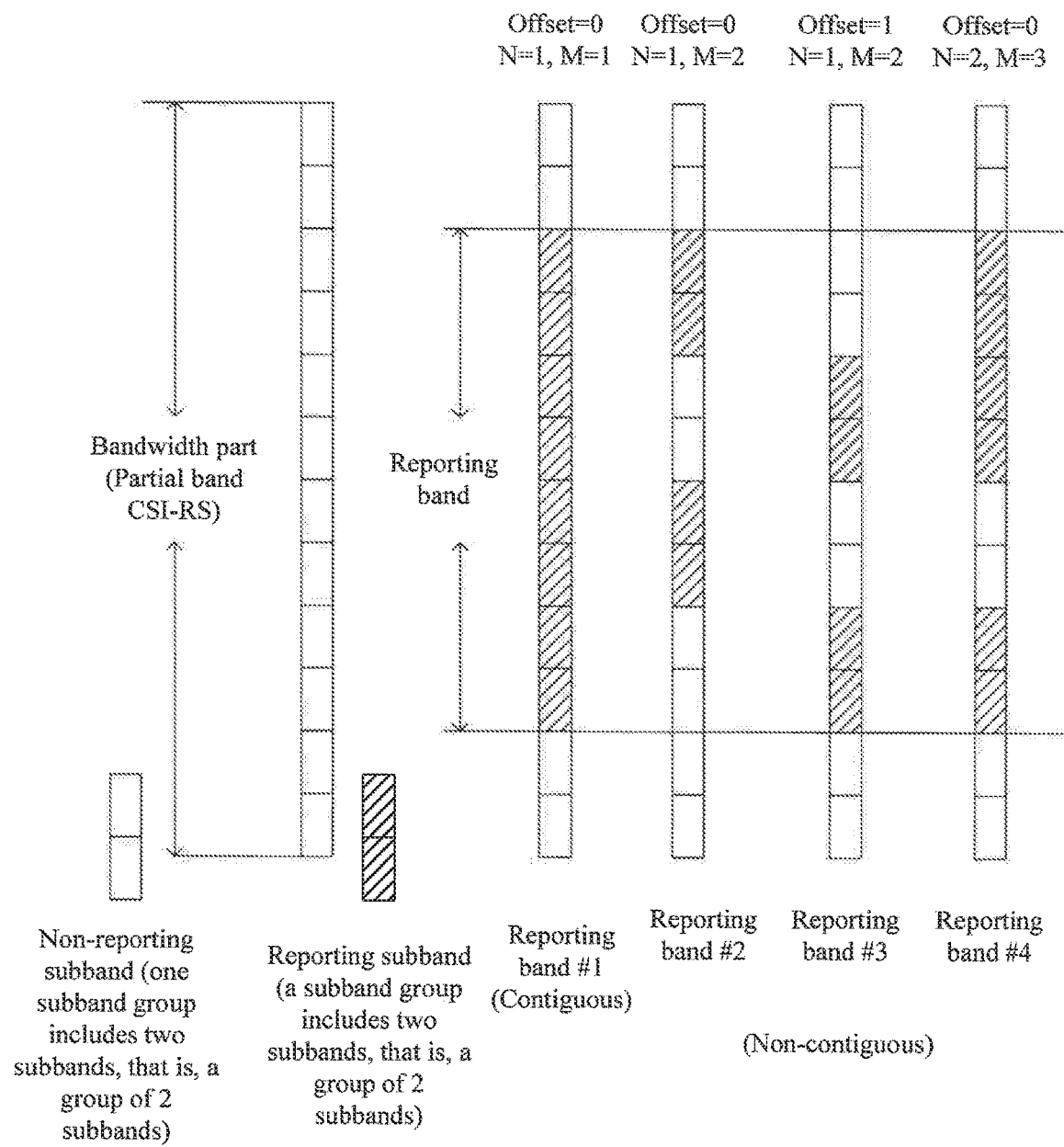
FIG. 14 is a schematic diagram of frequency band allocation according to another embodiment of the present invention.

For example, as shown in FIG. 14, the decimation ratio is equal to N/M, to be specific, the first N subband groups are decimated from every M contiguous subband groups to form a reporting band.

If N=1, M=1, and offset=0, it indicates that a reporting band includes contiguous subband groups that start from the first subband group.

If N=1, M=2, and offset=0, it indicates that starting from the first subband group, the first subband group is decimated from every two contiguous subband groups to form a reporting band.

If N=1, M=2, and offset=1, it indicates that one subband group is offset from the first subband group, that is, starting from the second subband group, the first subband group is decimated from every two contiguous subband groups to form a reporting band.

If N=2, M=3, and offset=0, it indicates that starting from the first subband group, the first two subband groups are decimated from every three contiguous subband groups to form a reporting band.

A beneficial effect of Embodiment 4 of the present invention lies in that, on the basis of grouping subbands, configuration complexity is further reduced by decimating a reporting subband group, and a measurement reporting solution by using which feedback overheads are reduced is supported in a specific scenario. For example, when there are relatively few channel frequencies for selection and coherence bandwidth is relatively wide, a frequency spacing for subband decimation may be increased.

Embodiment 7

In Embodiment 7, the N different reporting subbands that are decimated in advance according to Embodiment 5 based on the reporting subband configuration information are predefined as different subband subsets; or the N different reporting subband groups that are decimated in advance according to Embodiment 6 based on the reporting subband group configuration information are predefined as different subband subsets.

Similar to principles of Embodiment 3 and Embodiment 4, the method provided in this embodiment further includes: receiving dynamic signaling, where the dynamic signaling is used to indicate an index of a subband subset; and selecting a currently used subband subset from the plurality of predefined subband subsets based on the index of the subband subset.

Specifically, M groups of predefined pattern parameters are configured to indicate indexes of subsets. For example, the following four groups of parameters are configured:

a first group of parameters N1/M1;
a second group of parameters N2/M2;
a third group of parameters N3/M3; and
a fourth group of parameters N4/M4.

M groups of parameters are configured by using higher layer signaling. Each group of parameters corresponds to one of M candidate subband subsets, and one of the M subband subsets is selected as the currently used subband subset by using $[\log_2 M]$ bit dynamic signaling (DCI or a MAC CE).

A beneficial effect of the method lies in that configuration complexity is further reduced, and a measurement reporting solution by using which feedback overheads are reduced is supported in a specific scenario. Dynamic switching of subband subsets in an A-CSI/S-CSI reporting process can be supported by combining a dynamic signaling indication.

Embodiment 8

This embodiment provides an extension solution based on the foregoing predefined pattern. Specifically, for Embodiment 5, after the first N subbands or the last N subbands are decimated from every M contiguous subbands to be used as the reporting subbands, reporting is performed after priority sorting is performed on the decimated reporting subbands. Alternatively, for Embodiment 6, after the first N subband groups or the last N subband groups are decimated from every M contiguous subband groups as the reporting subband groups, reporting is performed after priority sorting is performed on the decimated reporting subband groups.

It should be noted that, the operations of subband decimation and priority sorting-based reporting described in this embodiment are performed for a reporting band of a to-be-measured frequency band, and an operation manner of another reporting band is implemented by analogy. In addition, for a plurality of to-be-measured frequency bands which perform CSI reporting (reporting) at a same moment, operation manners of one or more reporting bands of the plurality of to-be-measured frequency bands are also implemented by analogy, and details are not described again.

Figure 15:
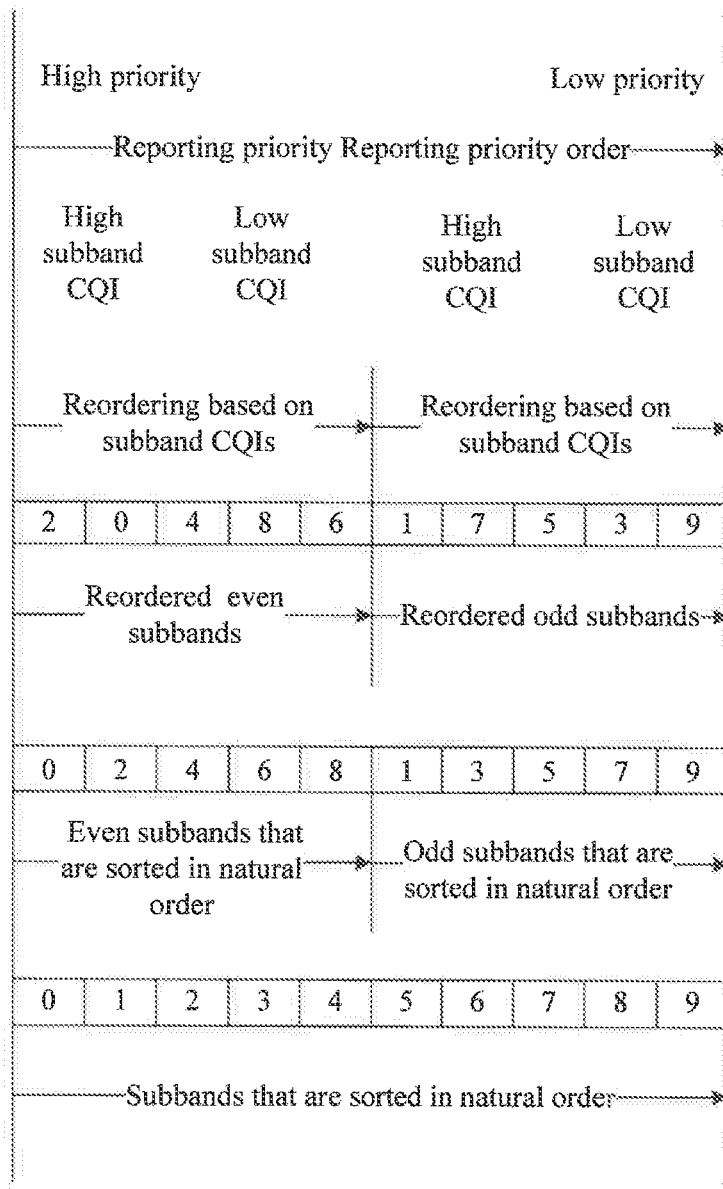
FIG. 15 is a schematic diagram of frequency band allocation according to another embodiment of the present invention.

For a to-be-measured frequency band, a decimation ratio (decimation ratio), namely, N/M, is configured for a reporting band. For example, when N=1 and M=2, K subbands are grouped into two groups. K=10 is used as an example, as shown in FIG. 15.

Subbands 0 to 9 are subbands sorted in natural order. First, the subbands are grouped into two groups based on N=1 and M=2, namely, a first group of subbands (including the subbands 0, 2, 4, 6, and 8) and a second group of subbands (including the subbands 1, 3, 5, 7, and 9). Then, each group of subbands are sorted according to values of subband CQIs measured on the subbands. For example, if the subband CQIs are sorted in descending order, the first group of subbands are sorted as the subbands 2, 0, 4, 8, and 6, and the second group of subbands are sorted as the subbands 1, 7, 5, 3, and 9. Based on this, reporting is performed in a sequence of the subbands 2, 0, 4, 8, 6, 1, 7, 5, 3, and 9 based on priorities thereof. The subband 2 has a highest priority, the subband 9 has a lowest priority, and reporting priorities of other subbands are deduced according to the foregoing order. Based on CSI overheads and a size of a transmission resource allocated by an uplink data channel or an uplink control channel to CSI reporting, when the transmission resource is insufficient for transmitting information about all subbands, a terminal first ensures that information about a subband having a high priority is transmitted, and information about a subband having a low priority is not transmitted. For example, when the uplink transmission resource is sufficient to transmit information about only three subbands, transmission is performed in a priority sequence of the subbands 2, 0, and 4, and transmission is not performed on other subbands. When the uplink transmission resource is sufficient to transmit information about only five subbands, transmission is performed in a priority sequence of the subbands 2, 0, 4, 8, and 6, and transmission is not performed on other subbands. When the uplink transmission resource is sufficient to transmit information about only seven subbands, transmission is performed in a priority sequence of the subbands 2, 0, 4, 8, 6, 1, and 7, and transmission is not performed on other subbands. The rest can be deduced by analogy.

Figure 16:
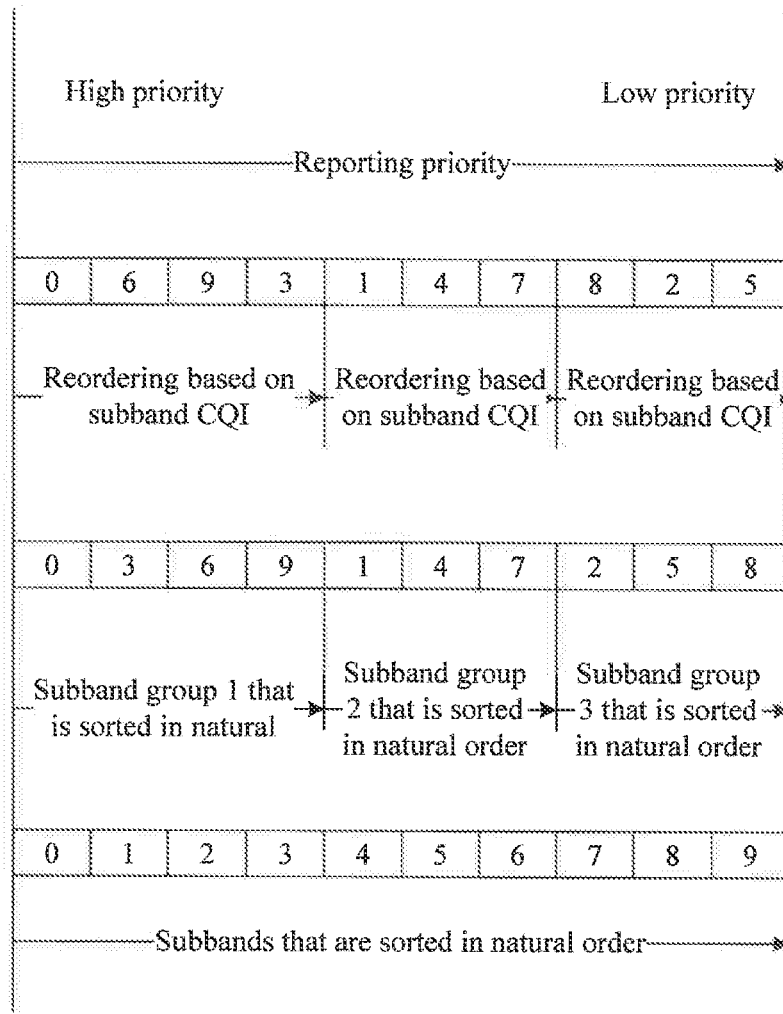
FIG. 16 is a schematic diagram of frequency band allocation according to another embodiment of the present invention.

When the decimation ratio (decimation ratio), namely, N/M, is configured, and N=1 and M=3, K subbands are grouped into three groups. K=10 is used as an example, as shown in FIG. 16.

Subbands 0 to 9 are subbands sorted in natural order. First, the subbands are grouped into three groups according to N=1 and M=3, namely, a first group of subbands (including the subbands 0, 3, 6, and 9), a second group of subbands (including the subbands 1, 4, and 7), and a third group of subbands (including the subbands 2, 5, and 8). Then, each group of subbands is sorted according to values of subband CQIs measured on the subbands. For example, if the subband CQIs are sorted in descending order, the first group of subbands are sorted as the subbands 0, 6, 9, and 3, the second group of subbands are sorted as the subbands 1, 4, and 7, and the third group of subbands are sorted as the subbands 8, 2, 5. Based on this, reporting is performed in a sequence of the subbands 0, 6, 9, 3, 1, 4, 7, 8, 2, and 5 based on priorities thereof. The subband 0 has a highest priority, the subband 5 has a lowest priority, and reporting priorities of other subbands are deduced according to the foregoing order. Based on CSI overheads and a size of a transmission resource allocated by an uplink data channel or a control channel to CSI reporting, when the transmission resource is insufficient for transmitting information about all subbands, a terminal first ensures that information about a subband having a high priority is transmitted, and information about a subband having a low priority is not transmitted. For example, when the uplink transmission resource is sufficient to transmit information about only three subbands, transmission is performed in a priority sequence of the subbands 0, 6, and 9, and transmission is not performed on other subbands. When the uplink transmission resource is sufficient to transmit information about only five subbands, transmission is performed in a priority sequence of the subbands 0, 6, 9, 3, and 1, and transmission is not performed on other subbands. When the uplink transmission resource is sufficient to transmit information about only seven subbands, transmission is performed in a priority sequence of the subbands 0, 6, 9, 3, 1, 4, and 7, and transmission is not performed on other subbands. The rest can be deduced by analogy.

Due to a limitation of CQI quantization precision, in the foregoing method for performing subband sorting and reporting based on the subband CQI, if a plurality of subbands have a same CQI, a sequence of the subbands is arranged based on a natural order of the subbands. For example, in the first group of subbands, if a CQI of the subband 0 is equal to a CQI of the subband 3, sorting and reporting are performed in an order of the subbands 0 and 3. In the second group of subbands, if a CQI of the subband 4 is equal to a CQI of the subband 7, sorting and reporting are performed in a sequence of the subbands 4 and 7. In the third group of subbands, if a CQI of the subband 2 is equal to a CQI of the subband 5, sorting and reporting are performed in a sequence of the subbands 2 and 5.

This embodiment is also applicable to a case in which subbands are grouped, that is, after the subbands are grouped in advance, a subband group on which transmission needs to be performed and a subband group on which transmission does not need to be performed are determined based on priorities.

A network side device can determine, based on the uplink transmission resource allocated to the terminal and information such as an RI and the CQI reported by a terminal device, overheads of subband CSI (for example, a PMI) reported by the terminal device, so as to calculate a quantity of reporting subbands of the terminal. The network side device may calculate subband sorting in each subband group based on the configured subband reporting pattern (the decimation ratio, namely, N/M) and subband CQI information that is reported by the terminal.

During implementation of this embodiment, when uplink transmission resources are limited, a receive end device performs uplink transmission on reporting subbands based on priorities, and discards some subbands that originally need to be used as the reporting subbands, to preferentially ensure a reporting subband having a higher priority, thereby saving signaling resources and ensuring transmission quality.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

To sum up, the foregoing descriptions are merely embodiments of the present invention, but are not intended to limit the protection scope of the present invention. Any modification, equivalent replacement, or improvement made without departing from the spirit and principle of the present invention shall fail within the protection scope of the present invention.

What is claimed is:

1. A channel measurement method, comprising:
    for a to-be-measured frequency band that comprises reporting subbands and at least one non-reporting subband, obtaining channel state information of each reporting subband, wherein the channel state information of each reporting subband is obtained based on channel estimation, and the reporting subbands are contiguous in frequency domain, or the reporting subbands are not contiguous in frequency domain;
    sending a measurement report of the to-be-measured frequency band to a transmit end device, wherein the measurement report comprises the channel state information of one or more of the reporting subbands;
    receiving dynamic signaling, wherein the dynamic signaling comprises a third information bitmap, and the third information bitmap is used to indicate an index of a first information bitmap or an index of a second information bitmap, wherein the information bit map is used to indicate the reporting subband and a non-reporting subband in the reporting band, wherein the second information bit map is used to a reporting subband group and non-reporting subband group; and
    selecting, based on an index indicator of the third information bitmap, the reporting subband and the non-reporting subband that are indicated by the first information bitmap or the reporting subband group and non-reporting subband group indicated by the second information bitmap;
    wherein the channel state information of the at least one non-reporting subband is based on the channel state information of the reporting subbands, and the channel state information of the at least one non-reporting subband is transmitted to the transmit end device.

2. The method according to claim 1, further comprising:
    receiving reporting subband configuration information from the transmit end device or searching for locally prestored reporting subband configuration information, wherein the reporting subband configuration information is used to indicate a reporting band and a subband that is a reporting subband in the reporting band; and
    determining at least one reporting subband in the reporting band based on the reporting subband configuration information.

3. The method according to claim 2, wherein the reporting subband configuration information further comprises reporting band indication information; and
    the reporting band indication information indicates a start position of the reporting subband and a quantity of the reporting subbands, or indicates a start position and an end position of the reporting subband.

4. The method according to claim 2, wherein a quantity of bits of the first information bitmap is the same as a quantity of actual reporting subbands, and all bits in the first information bitmap are used to indicate the reporting subband and the non-reporting subband; or
    a quantity of bits of the first information bitmap is the same as a maximum quantity of reporting subbands that is avowed by a system, and some or all bits in the first information bitmap are used to indicate the reporting subband and the non-reporting subband.

5. The method according to claim 2, wherein the reporting subband configuration information comprises reporting subband start position indication information and reporting subband decimation indication information; wherein the reporting subband start position indication information is used to indicate a start position of the reporting subband; and the reporting subband decimation indication information is used to instruct to decimate, from the start position of the reporting subband or from an offset of O subbands, first N subbands or last N subbands from every M contiguous subband as reporting subbands, wherein O, N and M are integers.

6. The method according to claim 5, wherein after the first N subbands or the last N subbands are decimated from every M contiguous subbands as the reporting subbands, reporting is performed after priority sorting is performed on the decimated reporting subbands.

7. The method according to claim 1, wherein the channel state information is one of the following information:
    a channel quality indicator, a preceding matrix indicator, a rank indication, and a channel state information reference signal resource indicator.

8. The method according to claim 1, wherein the channel state information of the at least one non-reporting subband and the channel state information of the reporting subbands are of different types.

9. The method according to claim 1, wherein the measurement report of the to-be-measured frequency band to the transmit end device includes some but less than all of the channel state information of the at least one non-reporting subband.

10. A receive end device, comprising:
a processor, configured to: for a to-be-measured frequency band that comprises reporting subbands and at least one non-reporting subband, obtain channel state information of each reporting subband, wherein the channel state information of each reporting subband is obtained based on channel estimation, and the reporting subbands are contiguous in frequency domain, or the reporting subbands are not contiguous in frequency domain; and
a transceiver, configured to:
send a measurement report of the to-be-measured frequency band to a transmit end device, wherein the measurement report comprises the channel state information of one or more of the reporting subbands, wherein the channel state information of the at least one non-reporting subband is transmitted to the transmit end device;
receive dynamic signaling, wherein the dynamic signaling comprises a third information bitmap, and the third information bitmap is used to indicate an index of a first information bitmap or an index of a second information bitmap, wherein the information bit map is used to indicate the reporting subband and a non-reporting subband in the reporting band, wherein the second information bit map is used to a reporting subband group and non-reporting subband group; and
select, based on an index indicator of the third information bitmap, the reporting subband and the non-reporting subband that are indicated by the first information bitmap or the reporting subband group and non-reporting subband group indicated by the second information bitmap.

11. The receive end device according to claim 10, wherein the transceiver is further configured to: receive reporting subband configuration information from the transmit end device or search for locally prestored reporting subband configuration information, wherein the reporting subband configuration information is used to indicate a reporting band and a subband that is a reporting subband in the reporting band; and
the processor is further configured to determine at least one reporting subband in the reporting band based on the reporting subband configuration information.

12. The receive end device according to claim 11, wherein the reporting subband configuration information comprises reporting subband indication information; and
the reporting subband indication information comprises a first information bitmap, and the first information bitmap is used to indicate the reporting subband and a non-reporting subband in the reporting band.

13. The receive end device according to claim 12, wherein the reporting subband configuration information further comprises reporting band indication information; and
the reporting band indication information indicates a start position of the reporting subband and a quantity of the reporting subbands, or indicates a start position and an end position of the reporting subband.

14. The receive end device according to claim 12, wherein a quantity of the first information bits is the same as a quantity of actual reporting subbands, and all bits in the first information bitmap are used to indicate the reporting subband and the non-reporting subband; or
a quantity of the first information bits is the same as a maximum quantity of reporting subbands that is allowed by a system, and some or all bits in the first information bitmap are used to indicate the reporting subband and the non-reporting subband.

15. The receive end device according to claim 11, wherein the reporting subband configuration information comprises reporting subband start position indication information and reporting subband decimation indication information; wherein the reporting subband start position indication information is used to indicate a start position of the reporting subband; and the reporting subband decimation indication information is used to instruct to decimate, from the start position of the reporting subband or from an offset of O subbands, first N subbands or last N subbands from every M contiguous subband as reporting subbands, wherein O, N and M are integers.

16. The receive end device according to claim 15, wherein the processor is further configured to: after the first N subbands or the last N subbands are decimated from every M contiguous subbands as the reporting subbands, perform reporting after performing priority sorting on the decimated reporting subbands.

17. The receive end device according to claim 11, wherein the channel state information is one of the following information:
a channel quality indicator, a precoding matrix indicator, a rank indication, and a channel state information reference signal resource indicator.

18. A chip, comprising:
a processor, configured to invoke an instruction from a memory and execute the instruction stored in the memory, so that a communications device on which the chip is installed performs the method according to claim 1.

* * * * *